(12) United States Patent
Chang et al.

(10) Patent No.: US 12,275,321 B2
(45) Date of Patent: Apr. 15, 2025

(54) CONCEALED CHARGING DEVICE OF ELECTRICAL VEHICLE AND METHOD THEREOF

(71) Applicants: Chia-Jen Chang, New Taipei (TW); Hao-Che Chang, New Taipei (TW)

(72) Inventors: Chia-Jen Chang, New Taipei (TW); Hao-Che Chang, New Taipei (TW)

( * ) Notice: Subject to any disclaimer, the term of this patent is extended or adjusted under 35 U.S.C. 154(b) by 623 days.

(21) Appl. No.: 17/492,679

(22) Filed: Oct. 4, 2021

(65) Prior Publication Data
US 2023/0106670 A1    Apr. 6, 2023

(51) Int. Cl.
| | | |
|---|---|---|
| *H02J 7/00* | (2006.01) | |
| *B60L 53/12* | (2019.01) | |
| *B60L 53/14* | (2019.01) | |
| *B60L 53/22* | (2019.01) | |
| *B60L 53/35* | (2019.01) | |
| *H02J 7/14* | (2006.01) | |

(52) U.S. Cl.
CPC ............... *B60L 53/35* (2019.02); *B60L 53/12* (2019.02); *B60L 53/14* (2019.02); *B60L 53/22* (2019.02); *H02J 7/0045* (2013.01); *B60L 2210/30* (2013.01)

(58) Field of Classification Search
CPC .......... B60L 53/35; B60L 53/12; B60L 53/22; B60L 53/14; H02J 7/0045
USPC ....................................................... 320/109
See application file for complete search history.

(56) References Cited

U.S. PATENT DOCUMENTS

| | | | | |
|---|---|---|---|---|
| 5,462,439 A | * | 10/1995 | Keith | B60L 1/12 439/246 |
| 5,523,666 A | * | 6/1996 | Hoelzl | B60L 53/35 320/109 |
| 8,890,475 B1 | * | 11/2014 | Becker | B60L 53/66 320/109 |
| 2011/0148350 A1 | * | 6/2011 | Wegener | B60L 53/12 320/108 |
| 2011/0300738 A1 | * | 12/2011 | Hengel | H01R 13/44 439/374 |
| 2013/0076902 A1 | * | 3/2013 | Gao | B25J 9/042 348/148 |
| 2014/0217977 A1 | * | 8/2014 | Pastoor | B60L 53/35 320/109 |
| 2016/0339791 A1 | * | 11/2016 | Sim | B60L 53/18 |
| 2017/0140603 A1 | * | 5/2017 | Ricci | B60L 5/16 |

(Continued)

*Primary Examiner* — Alexis B Pacheco
(74) *Attorney, Agent, or Firm* — Leong C. Lei

(57) ABSTRACT

A concealed charging device of an electrical vehicle, as well as a method thereof, is provided, including a base body arranged, in a concealed manner, in an electrical vehicle. The base body is provided with an extendible member. A driving member controls the extendible member for reciprocal movement in a longitudinal direction on the base body. The extendible member is also provided with an electricity-conducting assembly, which includes a conduction member and an electricity-conducting member. As such, to do charging, the driving member controls the extendible member to extend in the longitudinal direction and the electricity-conducting member is collaboratively operating with a charging seat to achieve electrical transmission of electricity through the electricity-conducting member and the conduction member for carrying out charging to a battery of the electrical vehicle. Further, the charging can be performed while traveling.

12 Claims, 20 Drawing Sheets

(56) References Cited

U.S. PATENT DOCUMENTS

| | | | |
|---|---|---|---|
| 2018/0075946 A1* | 3/2018 | Beimdieck | H01R 13/005 |
| 2018/0086212 A1* | 3/2018 | Dudar | B60L 53/12 |
| 2018/0105050 A1* | 4/2018 | Hengel | B60L 53/18 |
| 2023/0311688 A1* | 10/2023 | Perumalla | B60L 53/57 |
| | | | 320/109 |
| 2023/0368359 A1* | 11/2023 | Braunstein | B60L 3/12 |

* cited by examiner

CONCEALED CHARGING DEVICE OF ELECTRICAL VEHICLE AND METHOD THEREOF

TECHNICAL FIELD OF THE INVENTION

The present invention relates to a charging device, and more particularly to a concealed charging device of an electrical vehicle and a method thereof, in which the charging device is concealed in a vehicle body of the electrical vehicle so as to maintain the original aesthetics of the vehicle body and also to enhance the cruising endurability of the electrical vehicle.

DESCRIPTION OF THE PRIOR ART

An electrical vehicle that is powered solely with electricity is commonly referred to as a battery electrical vehicle that is one powered by a fully charged battery. A vehicle that is driven by an electrical machine is often referred to as an electrical vehicle in the media, due to the electricity of the battery is supplied from an external electricity source. The electrical vehicles do not emit exhaust on the roads and do not cause pollution to the atmosphere on the roads. Such an advantage is the primary reason that the electrical vehicles are promoted in all the countries around the world. Further, the electrical vehicles have an excellent capability of quickly speeding up at a low speed condition, and some working vehicles that require frequent stopping and moving again, such as buses and garbage trucks operating with high torque, have been substituted with electrical motors to improve efficiency. Different from fuel-combusting vehicles that require idling when stopping movement in order to prevent engine shutdown, the battery electrical vehicles allow the electrical machine to be completely shut down when stopping movement, and consuming no energy at all. This also effectively prevents vehicle jamming and waste of energy.

The electrical vehicles suffer a major problem concerning cruising endurability. In case that electricity runs out during travel, the electrical vehicle has to travel to a charging station to park and be charged. For the existing environment and technology of electrical charging, the number of charging stations is still small. The electrical vehicle, even when reaching a charging station, must be queued in line for charging. Even there is no need for queuing, the charging time is also a problem. This would affect the milage time and is inconvenient for the electrical vehicle owners.

In view of this, to improve the problems associated with charging of electrical vehicles, manufacturers proposed a charging device that enables charging to proceed during travel of an electrical vehicle. For example, Chinese Patent CN107054365 B provides a method for operating a motor vehicle, a controller of a motor vehicle, and a motor vehicle. The patent resolves the problem of running out of electricity during travel of an electrical vehicle, allowing the electrical vehicle to be charged simultaneously with traveling of the electrical vehicle, achieving an advantage of saving mileage time. Further, Taiwan Patent 1428845 provides an on-road charging system and method. The patent proposes a charging system embedded in a road surface, and this also resolve the issue of running out of electricity during traveling of an electrical vehicle.

However, the above-mentioned patent that provides a method for operating a motor vehicle, a controller of a motor vehicle, and a motor vehicle suffers the following problems in use and further improvements are necessary;

Firstly, although the problem of charging can be resolved, a charging arm provided therein is expanded in a fan shape for being disposed on a chassis of an electrical vehicle, so that a large area is necessary for installation, making it occupying a large space and deficient in concealability.

Secondly, due to being installed on an outside of a body of an electrical vehicle to occupy a large area and being expanded in a fan shape, it is not good for outside appearance of the electrical vehicle, and would deteriorate the overall aesthetics of the vehicle body.

Thirdly, due to being installed in a manner of being exposed outside the body of the electrical vehicle, it could be easily damaged and may cause risk of electric leakage.

Fourthly, due to the number of charging points being small today, queuing is necessary for doing charging, and this wastes time.

Fifthly, rainwater accumulated on a road surface in raining days would cause potential risk of electrical shocks due to the technology of burying charging stations in the earth, and this might be extremely dangerous.

SUMMARY OF THE INVENTION

An objective of the present invention is to provide a concealed charging device of an electrical vehicle and a method thereof. The main structure comprises a base body, at least one extendible member, an electricity-conducting assembly, and a driving member. The base body is arranged on the electrical vehicle, and the extendible member is arranged on the base body, so that the driving member that is arranged on the electrical vehicle controls the extendible member to reciprocally move in a longitudinal direction on the base body. Further, the electricity-conducting assembly is arranged on the extendible member, the electricity-conducting assembly comprises a conduction member electrically connected with a battery of the electrical vehicle and at least one electricity-conducting member arranged at an end of the extendible member and electrically connected with the conduction member. When the extendible member is in an extended state, the electricity-conducting member is away from the base body. As such, when the battery of the electrical vehicle is still of a sufficient amount of electricity, the driving member does not drive the extendible member to extend on the base body, so that at this moment, the electricity-conducting member is located at one side of the base body. When the battery of the electrical vehicle is running short of electricity, the driver may activate the driving member to allow the driving member to drive the extendible member to move outward in the longitudinal direction on the base body, and the electricity-conducting member is moved away from the base body, and as such an extension operation for performing charging is completed. Further, the base body can be arranged on the chassis of the electrical vehicle or in the interior of a bump, which is generally not noticed by a user, so as to achieve an effect of concealing.

Following the above-described techniques, the problems that the charging arm has to expand in a fan shape and has to be disposed on a chassis of an electrical vehicle found in the prior art patent of a method for operating a motor vehicle, a controller of a motor vehicle, and a motor vehicle, making it necessary to use a large area for installation and occupying quite a space and providing no concealability, and making the overall aesthetics poor resulting from no concealability, and suffering risk of electrical leakage can be overcome, and thus, the present invention may achieve practical advantages of being capable of charging without parking, effectively resolving shortage of electricity resulting from traffic congestion, and effectively prolonging travel distance, occupying no space for the entirety thereof and featuring concealability, low cost, operability in raining days, no concern of safety, and no damage to the aesthetics of the electrical vehicle.

DETAILED DESCRIPTION OF THE PREFERRED EMBODIMENT

Figure 1:
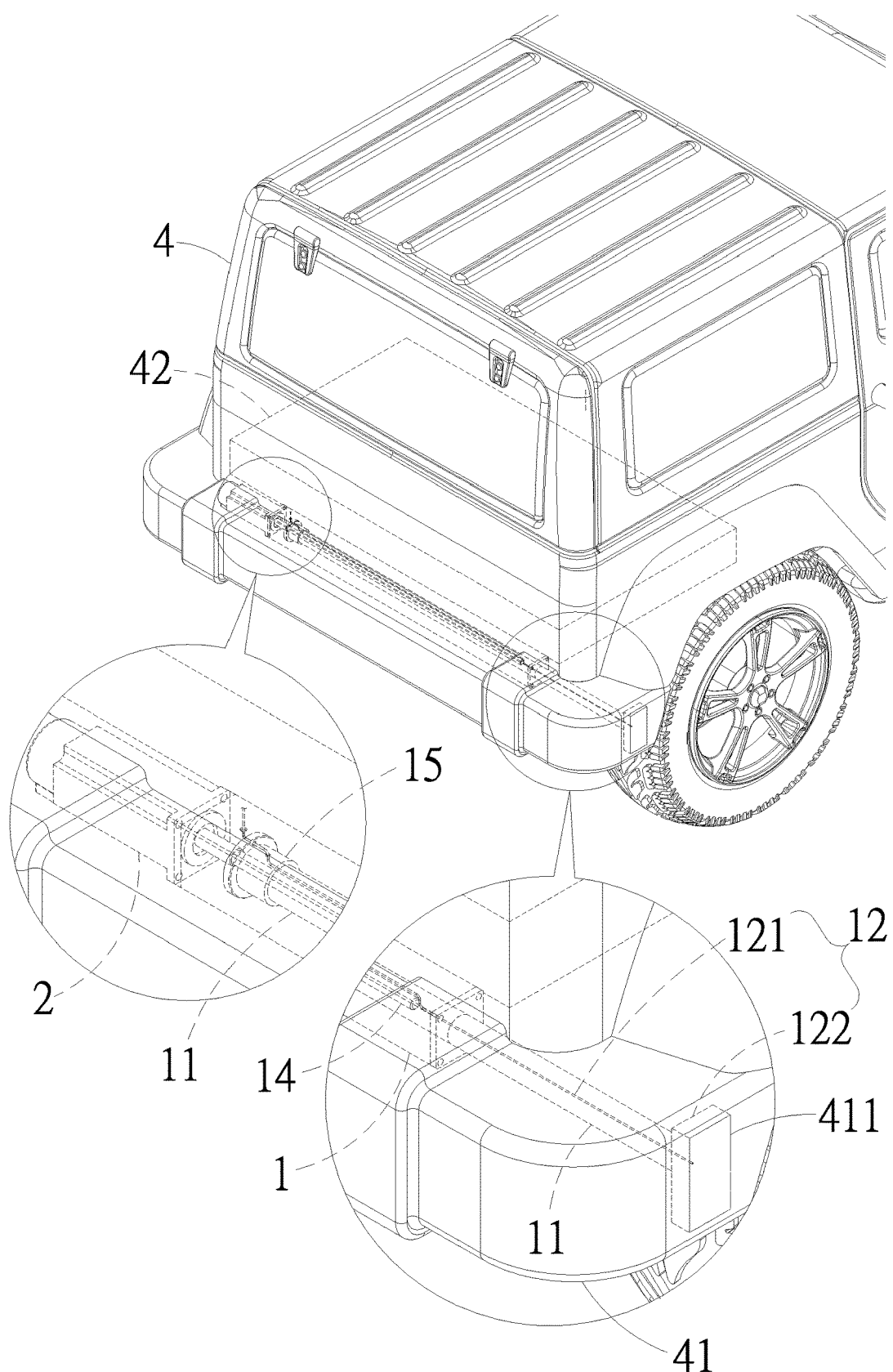
FIG. 1 is a perspective view, in a see-through form, showing the present invention is arranged as being concealed inside a rear bumper of an electrical vehicle.
Figure 2:
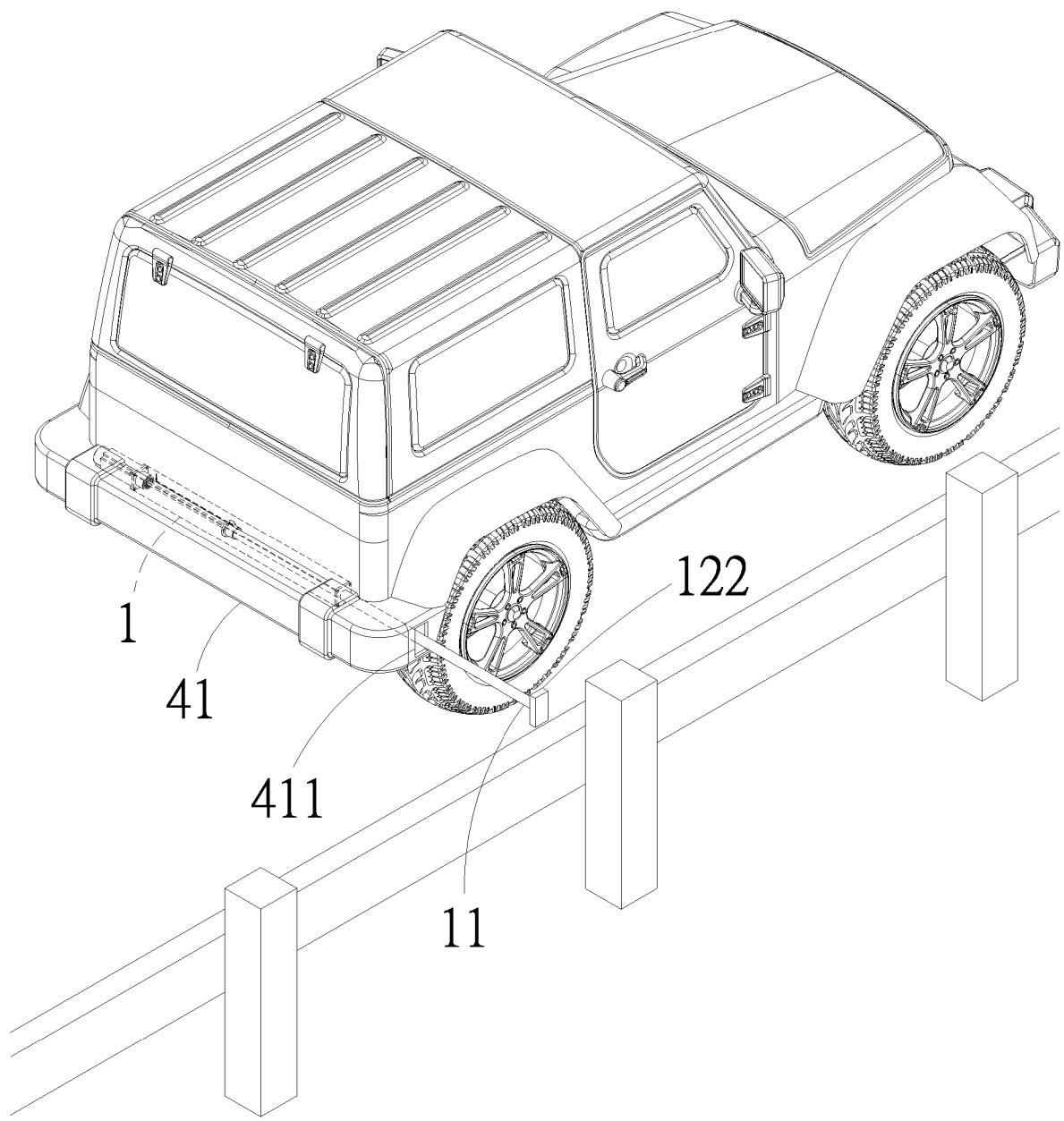
FIG. 2 is a perspective view showing an extendible member of the present invention is being extended.
Figure 3:
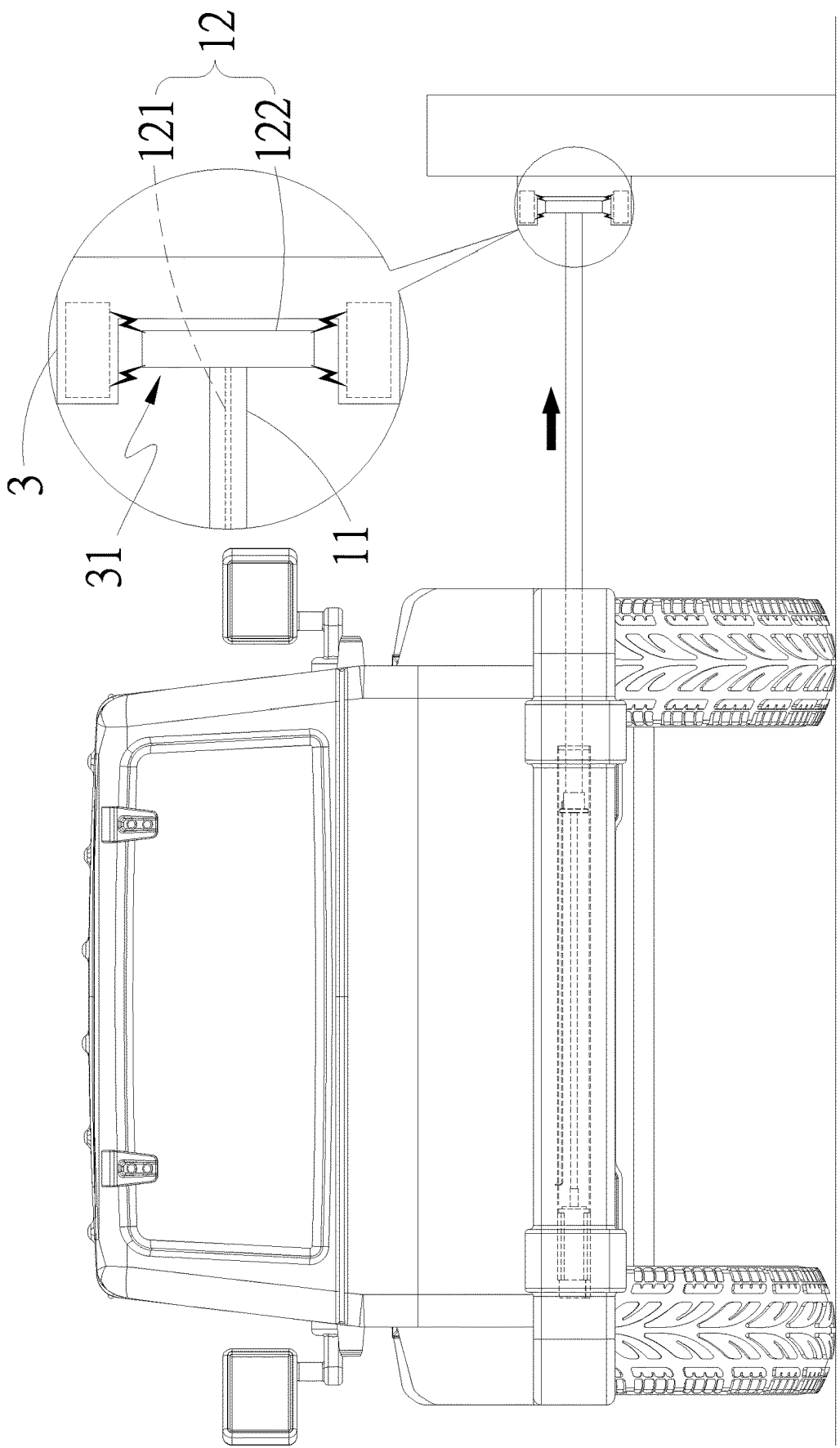
FIG. 3 is a side elevational view showing an electricity-conducting member of the present invention is being connected to a charging seat.
Figure 4:
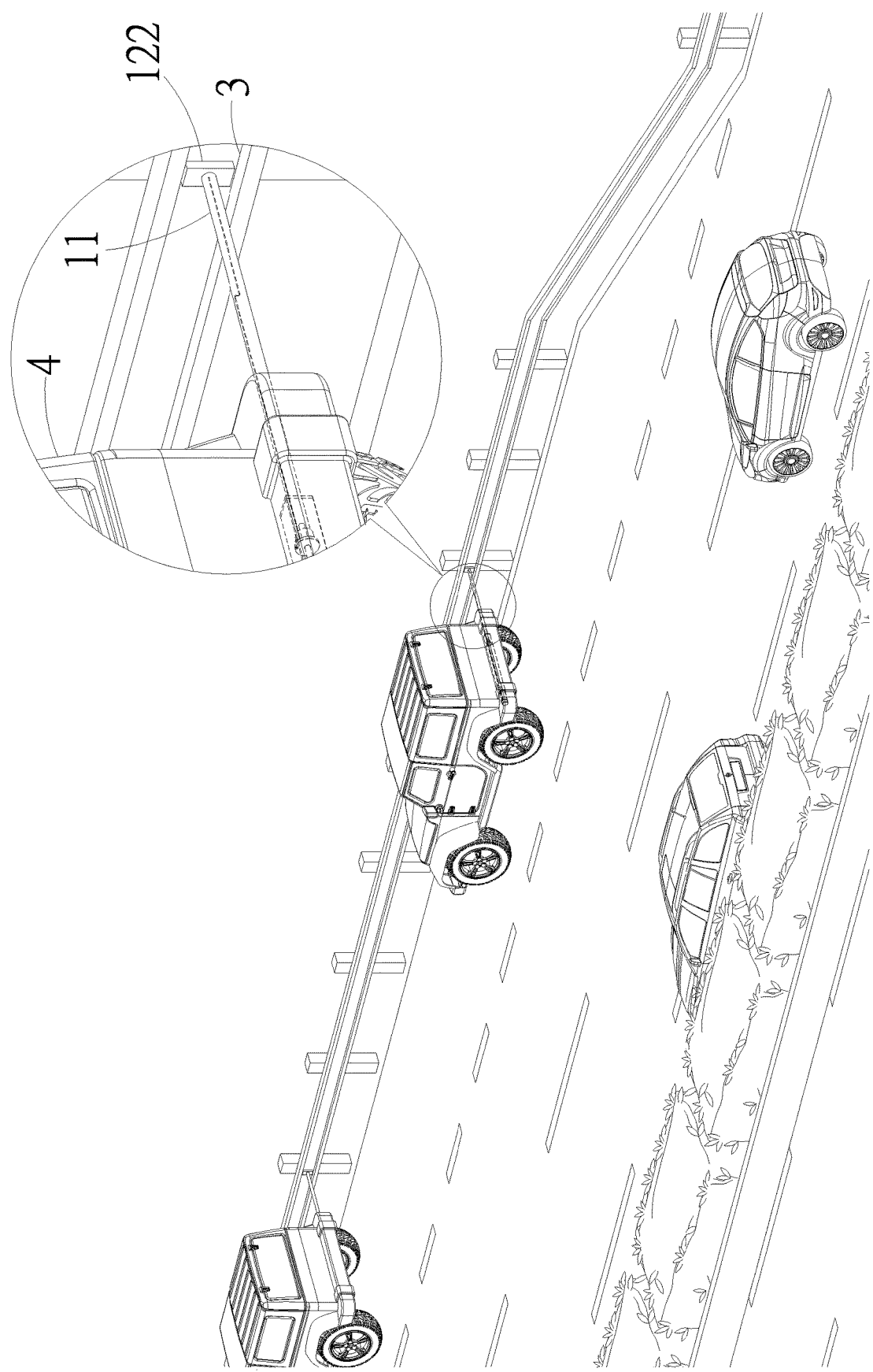
FIG. 4 is a perspective view showing an electrical vehicle is being charged during travel according to the present invention.

Referring to FIG. 1, which is a perspective view, in a see-through form, showing the present invention is arranged as being concealed inside a rear bumper of an electrical vehicle, it can be clearly seen in the drawing that the present invention comprises:

a base body 1, which is arranged, in a concealed manner, in an electrical vehicle 4, the electrical vehicle 4 having a vehicle body 41 that has a side in which a through opening 411 is formed;

at least one extendible member 11, which is arranged on the base body 1 and is reciprocally moveable in a longitudinal direction on the base body 1;

an electricity-conducting assembly 12, which is arranged on the extendible member 11, the electricity-conducting assembly 12 comprising a conduction member 121 electrically connected with a battery 42 of the electrical vehicle 4 and at least one electricity-conducting member 122 arranged at an end of the extendible member 11 and electrically connected with the conduction member 121, wherein in a contracted state of the extendible member 11, the electricity-conducting member 122 is received in the through opening 411, and in an extended state of the extendible member 11, the electricity-conducting member 122 is away from the through opening 411; and a driving member 2, which is arranged on the electrical vehicle 4 and is electrically connected with the extendible member 11 to control the reciprocal movement of the extendible member 11 in the longitudinal direction on the base body 1.

In the above, the base body 1 and the extendible member 11 of the instant embodiment are arranged to combine with the driving member 2 to form an electrically-powered extendible member, but not limited thereto, and may alternatively be arranged as a pneumatic rod.

In the above, a rear bumper of the electrical vehicle 4 is taken as an example for the vehicle body 41 in the instant embodiment.

In the above, an electrical wire is taken as an example for the conduction member 121 in the instant embodiment.

In the above, electromagnetic coil induction is taken as an example for the electricity-conducting member 122 in the instant embodiment.

In the above, an electrical motor is taken as an example for the driving member 2 in the instant embodiment, and the base body 1 comprises, as being arranged therein, a screw rod 14 fixedly connected to the driving member 2 and a moving block 15 screwed on the screw rod 14, the moving block 15 being fixedly connected to the extendible member 11.

As such, since there is commonly a space present in the rear bumper of the electrical vehicle 4, the invention can be directly installed in the space of the rear bumper of the electrical vehicle 4, so that a driver, when making an observation from any side of the electrical vehicle 4, does not see the concealed charging device of the invention. Further, in a condition that the extendible member 11 is not activated, the electricity-conducting member 122 is located in the through opening 411, and the electricity-conducting member 122 has an outside surface that is generally set in flush with the vehicle body 41, so that excellent concealment is achieved and, also, excellent overall aesthetics can be possessed.

With simultaneous reference to FIGS. 1-4, which are, respectively, a perspective view, in a see-through form, showing the present invention is arranged as being concealed inside a rear bumper of an electrical vehicle, a perspective view showing an extendible member of the present invention is being extended, a side elevational view showing an electricity-conducting member of the present invention is being connected to a charging seat, and a perspective view showing an electrical vehicle is being charged during travel according to the present invention, it can be clearly seen in the drawings that the electricity-conducting member 122 as described in the instant embodiment is electrically connectable with a charging seat 3. The charging seat 3 comprises a charging space 31 in the form of a trough or recess. Further, in the instant embodiment, being arranged on a guard rail at a road side is taken as an example for the charging seat 3, meaning the charging seat 3 is integrated with the road-side guard rail and can be installed at a turnout of a rod. In the instant embodiment, a highway can be taken as an example for the road, or alternatively, other types of speedway may be used instead. As such, when the electrical vehicle 4 is travelling on the highway and is going to run out of electricity, the driver may operate the electrical vehicle 4 to move into the turnout of the highway and activates the driving member 2 to drive the screw rod 14, so that the screw rod 14 rotates and also moves the moving block 15 out to have the moving block 15 in turn move the extendible member 11 outward for conducting an extension operation, where the extension direction, by taking a reference to the base body 1, is moving in the longitudinal direction. At this moment, the electricity-conducting member 122 of the electricity-conducting assembly 12 moves away from the through opening 411, allowing the extendible member 11 to extend out for a predetermined length and then stop the extension operation. Afterwards, the driver introduces the electricity-conducting member 122 into the charging space 31 of the charging seat 3 to allow electricity to be generated through electromagnetic induction, and the electricity so generated is transmitted through the conduction member 121 into the battery 42 of the electrical vehicle 4 for implementing a charging operation to thereby help extend the travel distance. Further, since the charging seat 3 is integrated with the guard rail and is not arranged in a road surface, when water accumulates in a raining day, there is no risk of electrical shock, exhibiting extremely high degree of safety. Further, when the driver drives the electrical vehicle 4 out of the turnout, the electricity-conducting member 122 is simultaneously moved away from the charging space 31, and the driving member 2 is operated to contract the extendible member 11 to make the electricity-conducting member 122 received into the through opening 411, thereby completing a stowing operation. Further, when the extendible member 11 extends, deformation may occur on the extendible member 11 due to wind resistance resulting from a traveling speed of the electrical vehicle 4; however, the extendible member 11 can be made of a material of one of glass fiber, carbon fiber, or nanometer boron fiber, and titanium alloy, all featuring extendibility and flexibility. As such, the extendible member 11 of the invention may be just like a fishing rod, which is not easily broken or ruptured.

Figure 5:
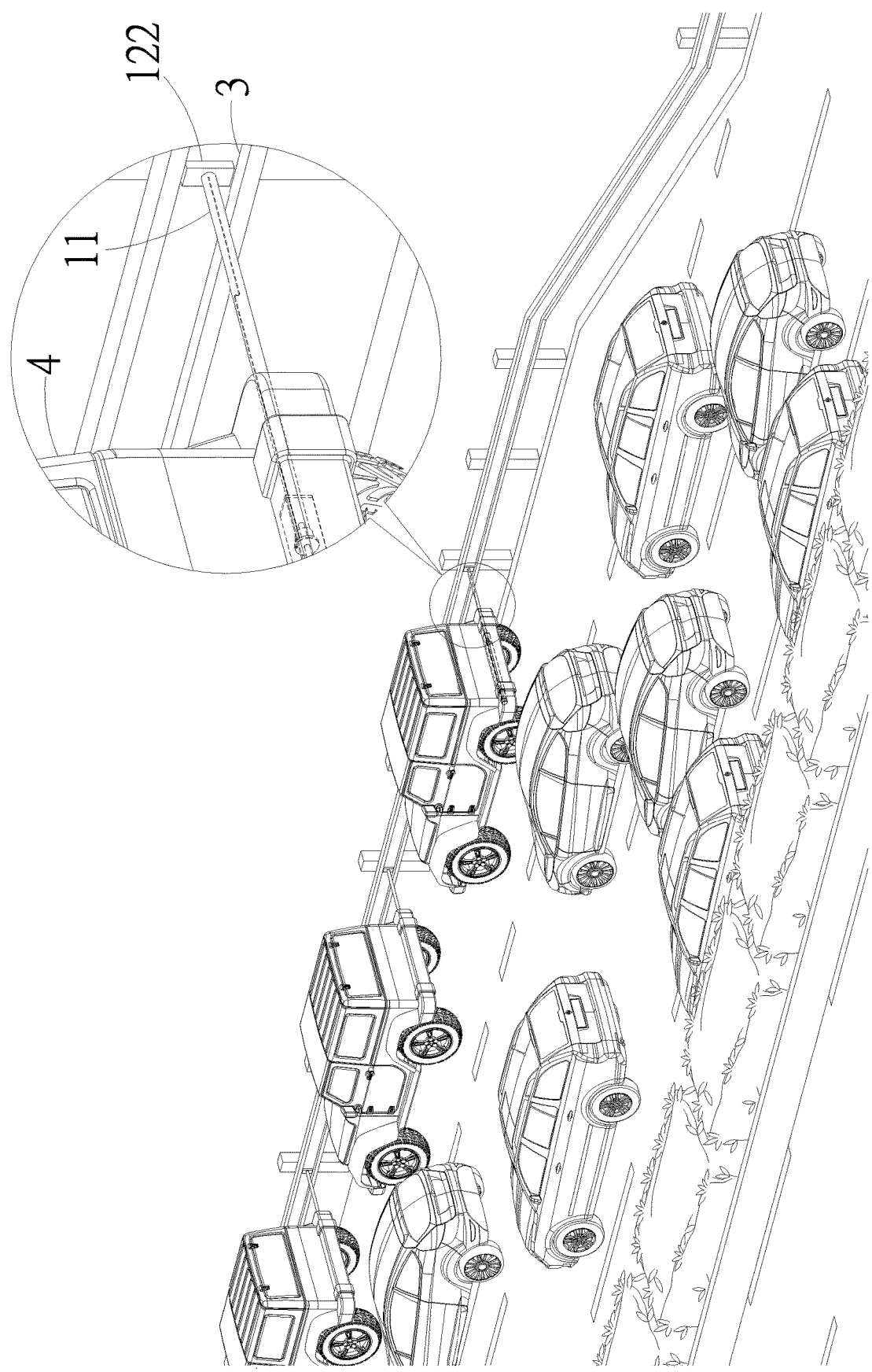
FIG. 5 is a perspective view showing an electrical vehicle is being charged during traffic congestion according to the present invention.

Referring to FIG. 5, which is a perspective view showing an electrical vehicle is being charged during traffic congestion according to the present invention, it can be clearly seen in the drawing that when the driver drives the electrical vehicle 4 in a traffic congestion on a highway, the electrical vehicle 4 can be driven into a turnout and the extendible member 11 is extended to have the electricity-conducting member 122 connected to and operating with the charging seat 3 to generate electricity. In other words, although the traffic congestion makes it not possible to have the electrical vehicle 4 moving fast, the operation time between the electricity-conducting member 122 and the charging seat 3 is thus extended to have more electricity charged into the electrical vehicle 4 to further extend the travel time thereby effectively resolving the issue of driver's panic due to shortage of electricity. Other details concerning operative relationships among the through opening, the extendible member 11, the electricity-conducting assembly, and the driving member are similar to what described above, and repeated description will be omitted here.

Figure 6:
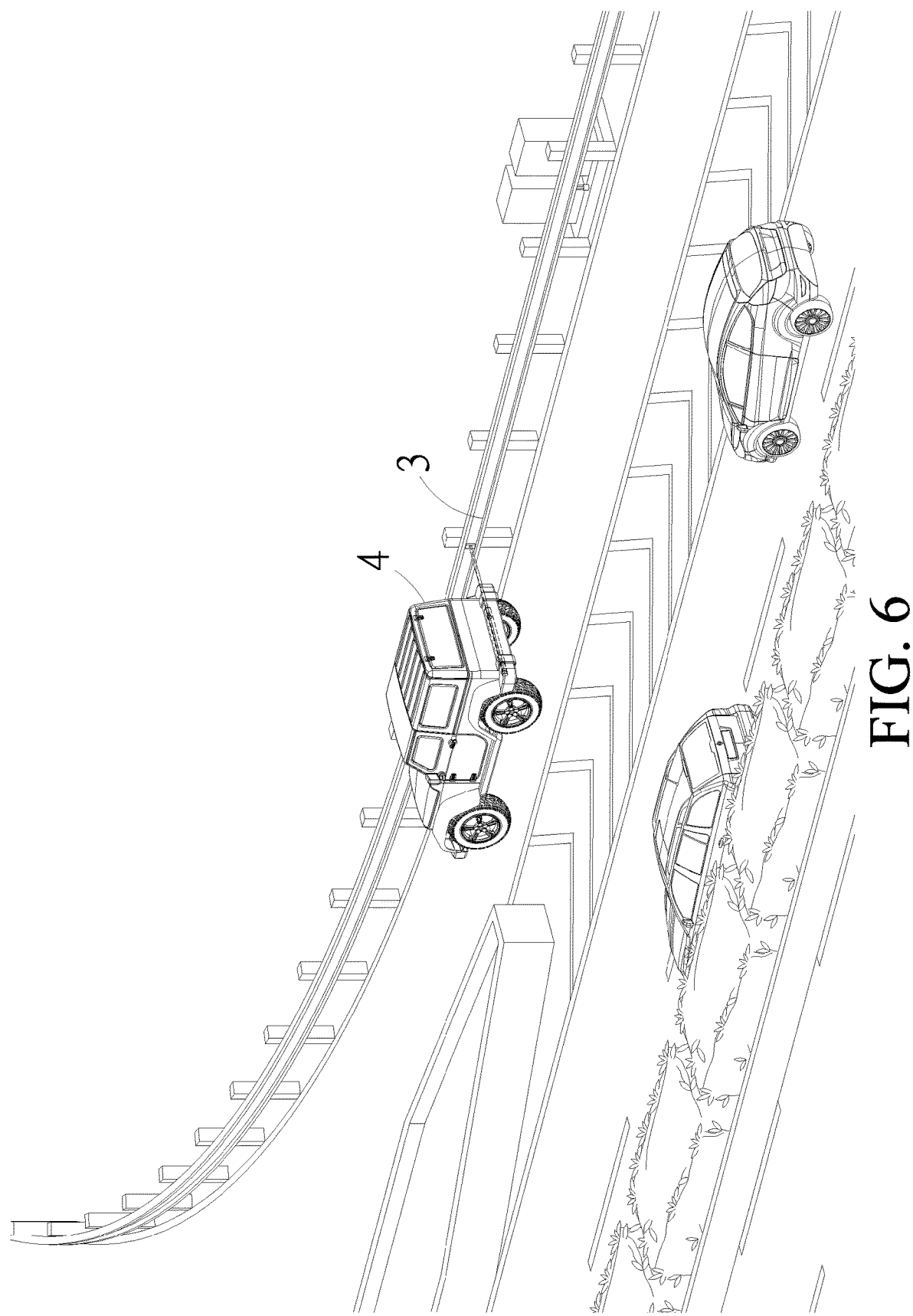
FIG. 6 is a schematic view showing an embodiment of a charging station installed at an interchange according to the present invention.

Referring to FIG. 6, which is a schematic view showing an embodiment of a charging station installed at an interchange according to the present invention, it can be clearly seen in the drawing that in addition to being arranged at a turnout of a highway, the charging seat 3 may be instead arranged on a guard rail of an interchange of a highway to allow the electrical vehicle 4 to do charging even when driving into or out of a rest area in order to further extend the travel distance.

Figure 7:
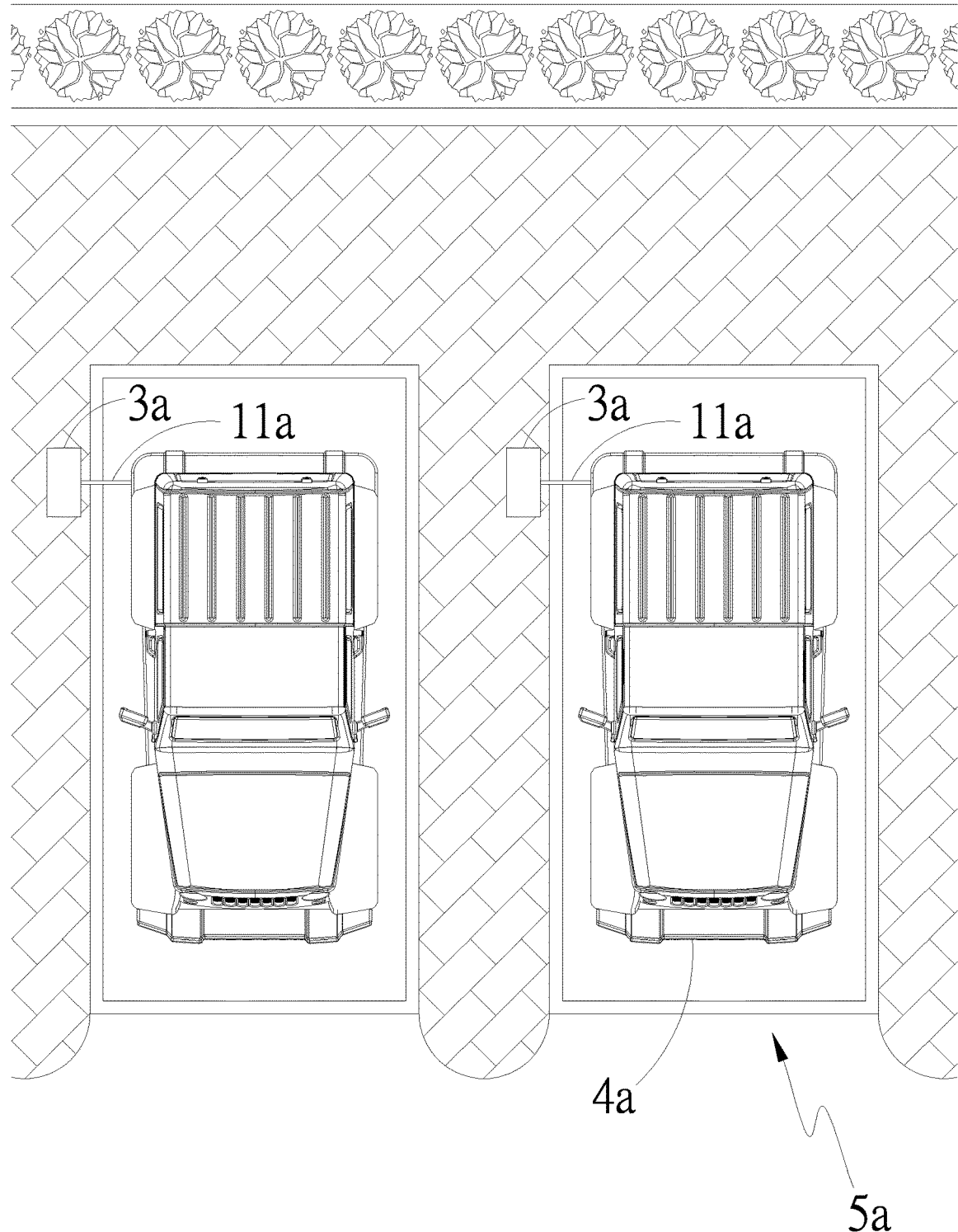
FIG. 7 is a schematic view showing an embodiment of a charging station installed in a parking lot according to the present invention.

Referring to FIG. 7, which is a schematic view showing an embodiment of a charging station installed in a parking lot according to the present invention, it can be clearly seen in the drawing that in addition to being arranged at a turnout of a highway or on a guard rail of an interchange, the charging seat 3a may be instead arranged in a parking lot 5a in the form of an upright charging pile, so that a driver, after having parked the electrical vehicle 4a in a parking space, may extend the extendible member 11a to have the electricity-conducting member connected to the charging seat 3a for operation together to generate electricity, achieving an effect of charging all the time even when the driver is taking a rest, this being extremely convenient. Other details concerning operative relationships among the through opening, the extendible member 11a, the electricity-conducting assembly, and the driving member are similar to what described above, and repeated description will be omitted here.

Figure 8:
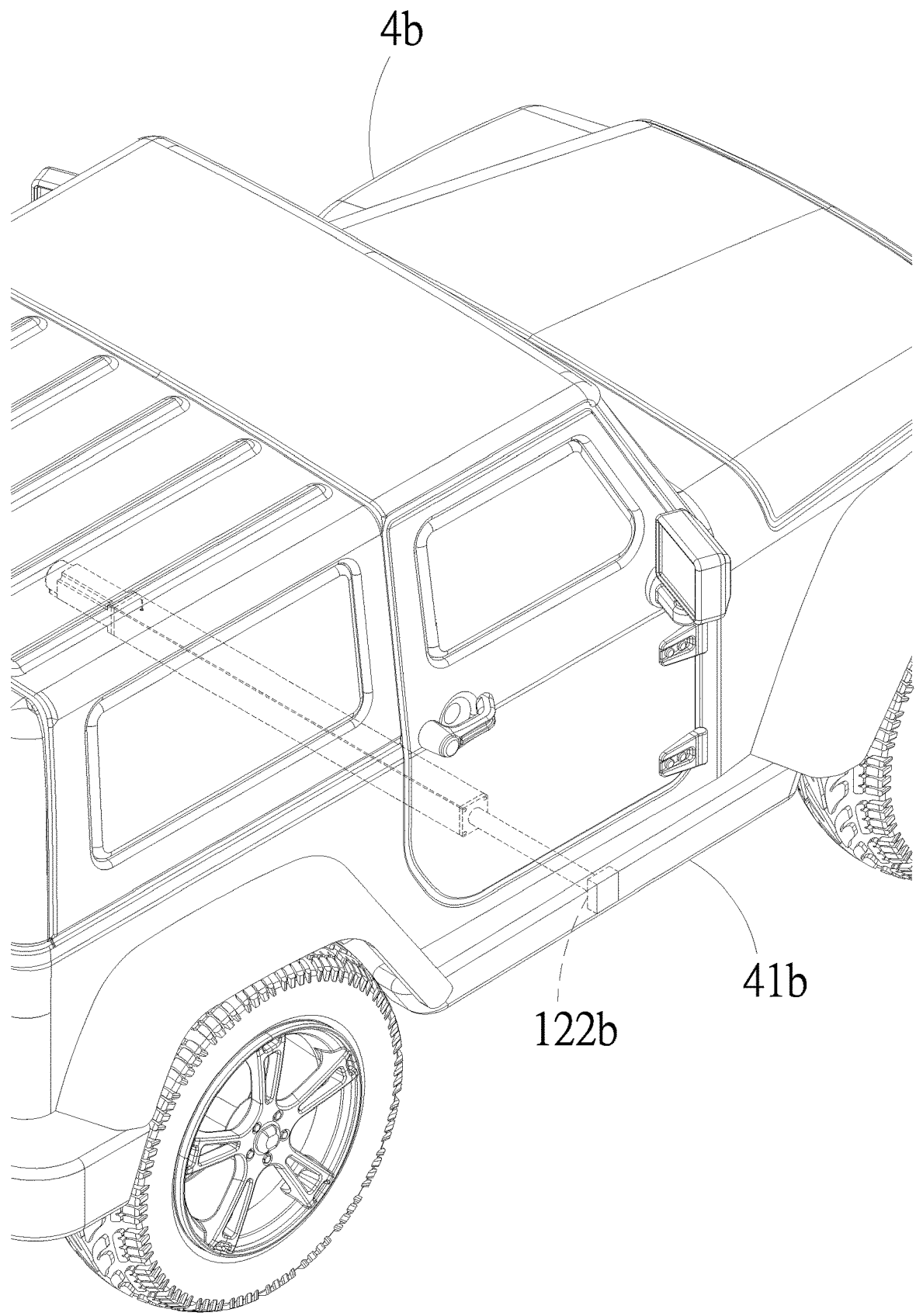
FIG. 8 is a perspective view, in a see-through form, showing the present invention is arranged as being concealed in a central side tread board of an electrical vehicle according to the present invention.

Referring to FIG. 8, which is a perspective view, in a see-through form, showing the present invention is arranged as being concealed in a central side tread board of an electrical vehicle according to the present invention, it can be clearly seen in the drawing that in addition to being installed in the rear bumper of the electrical vehicle 4b the rear bumper, the invention can also be arranged in a central side tread board of the electrical vehicle 4b. The central side tread board is also a part of the vehicle body 41b of the electrical vehicle 4b, and thus, the through opening can be formed in the side tread board to allow the electricity-conducting member 122b to be received in the through opening, so that compared to being arranged inside the rear bumper, a similar effect of excellent concealment can also be achieved, making it hard to identify the invention either from a lateral side or a rear side of the vehicle, exhibiting an excellent effect of aesthetics.

Figure 9:
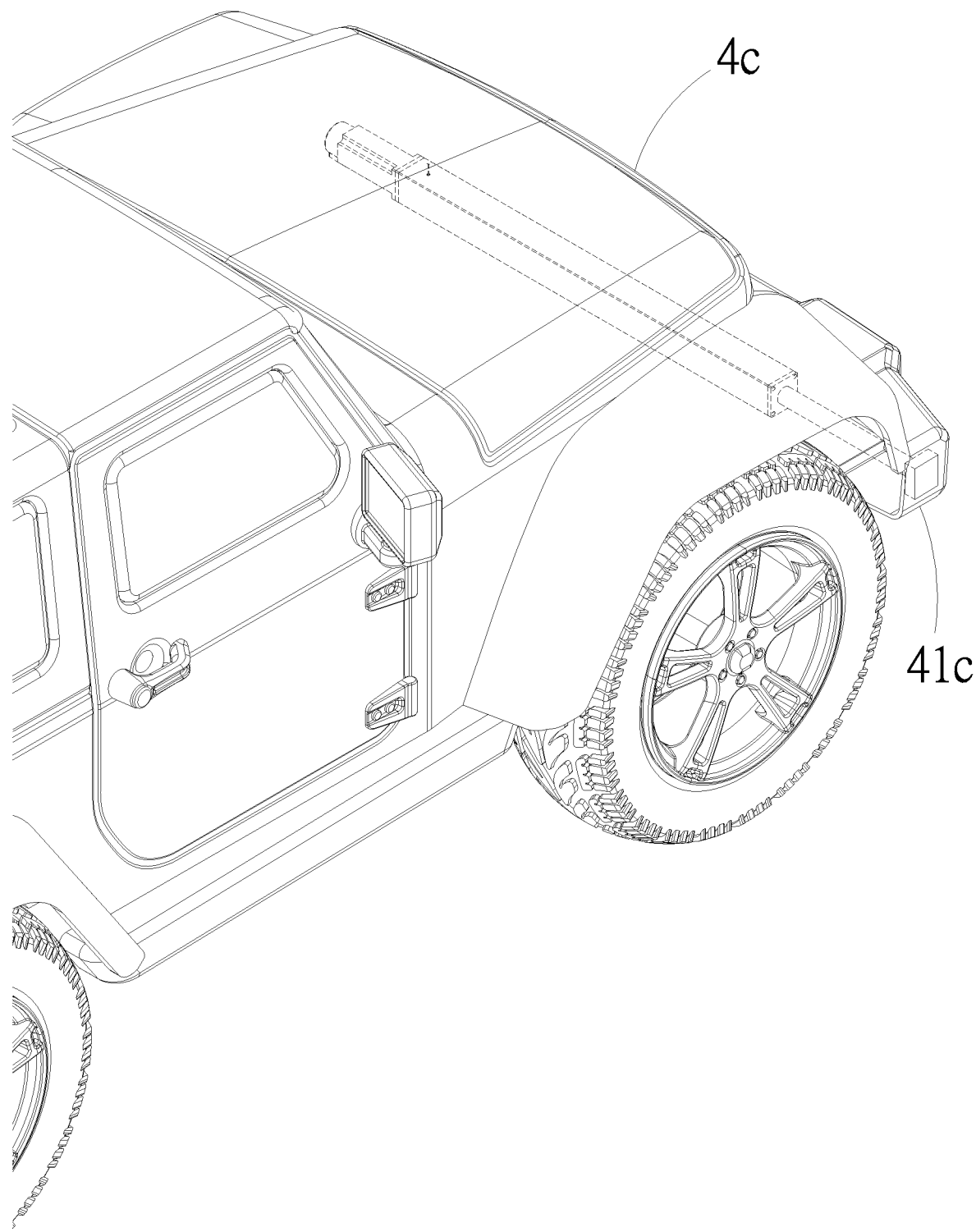
FIG. 9 is a perspective view, in a see-through form, showing the present invention is arranged as being concealed inside a front bumper of an electrical vehicle.

Referring to FIG. 9, which is a perspective view, in a see-through form, showing the present invention is arranged as being concealed inside a front bumper of an electrical vehicle, it can be clearly seen in the drawing that in addition to being arranged in the rear bumper and the side tread board of the electrical vehicle 4c, the invention can also be arranged inside a front bumper of the vehicle body 41c of the electrical vehicle 4c. This also achieves an effect of excellent concealment and does not destroy the overall aesthetics of the outside appearance of the electrical vehicle 4c.

Figure 10:
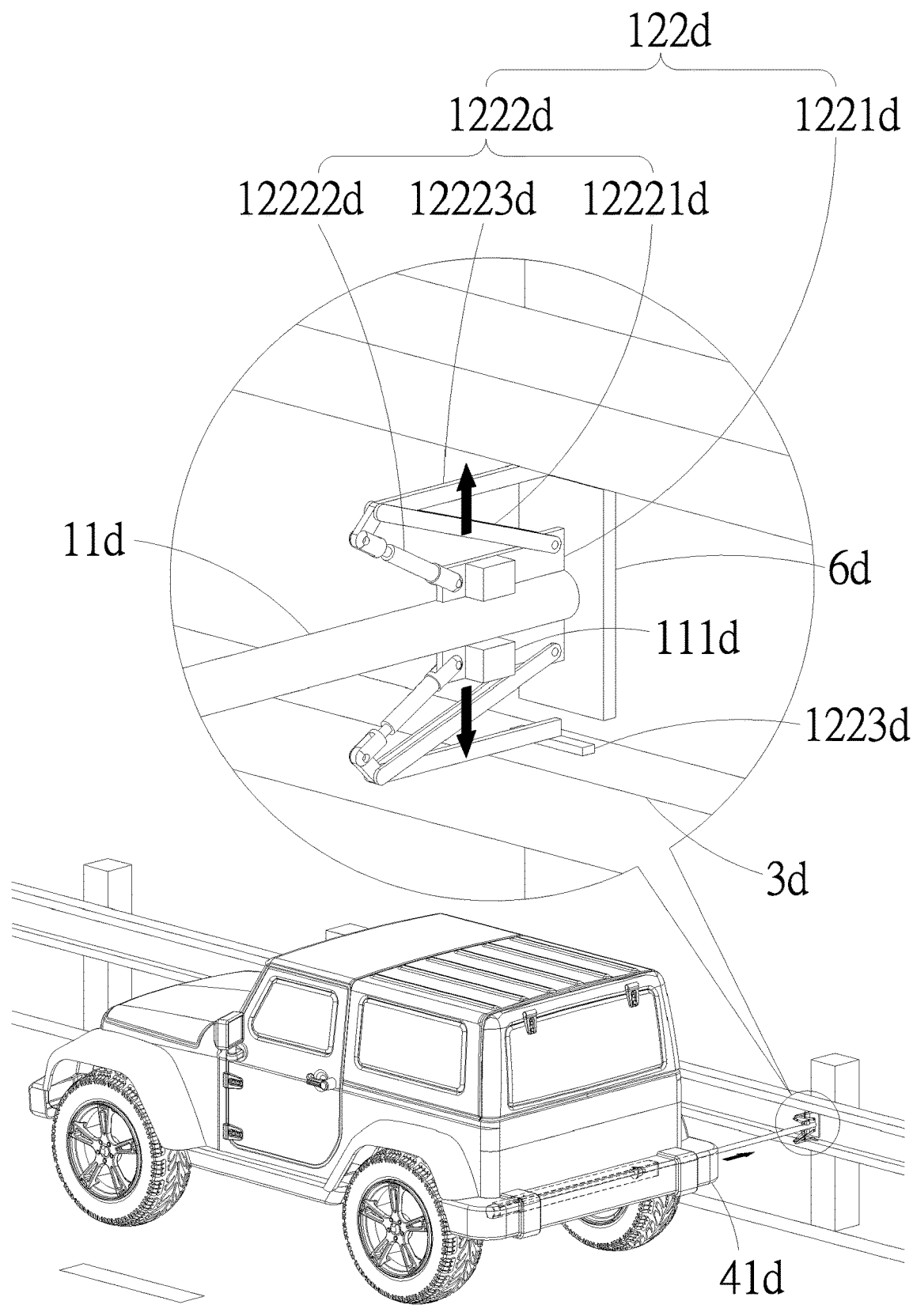
FIG. 10 is a schematic view showing an embodiment of a form of an extendible electricity-conducting member of the present invention.

Referring to FIG. 10, which is a schematic view showing an embodiment of a form of an extendible electricity-conducting member of the present invention, it can be clearly seen in the drawing that the electricity-conducting member 122d is provided, on one side thereof that is opposite to the extendible member 11d, with a decoration plate 6d having the same color as the vehicle body 41d. And, in the instant embodiment, the electricity-conducting member 122d is implemented as including multiple ones that are respectively arranged at two sides of the extendible member 11d, and the electricity-conducting member 122d comprises a base portion 1221d, a linkage 1222d rotatably mounted to the base portion 1221d, and a conductor 1223d arranged at an end of the linkage 1222d that is opposite to the base portion 1221d, wherein, in the instant embodiment, the linkage 1222d and the conductor 1223d are made of electrically conductive metallic materials, wherein the linkage 1222d comprises a first link 12221d pivoted to the base portion 1221d, a second link 12222d pivoted to the base portion 1221d, and a third link 12223d having an end pivoted to an end of each of the first link 12221d and the second link 12222d that is opposite to the base portion 1221d, and the conductor 1223d is arranged on the third link 12223d. As such, when the driven intends to make charging, in addition to extending the extendible member 11d, a motor 111d that is arranged on the extendible member 11d is further employed to electrically connect with and drive the linkage 1222d for performing an ascending operation, so that during the ascending of the linkage 1222d, the motor 111d drives the first link 12221d and the second link 12222d to rotate upward and causes the third link 12223d to move upward, in a balanced manner, thereby making the conductors 1223d expand in upward and downward direction to collaboratively operate with the charging seat 3d to transfer electricity. When the extendible member 11d contracts back into the vehicle body 41d, the decoration plate 6d is received in the through opening, and the decoration plate 6d is of the same color as the vehicle body 41d, so that the integrity of the vehicle body 41d is kept when being observed from outside, achieving an effect of concealment. The instant embodiment provides that the electricity-conducting member 122d of the invention can be of an extendible form, or a non-extendible form, and is not limited thereto.

Figure 11:
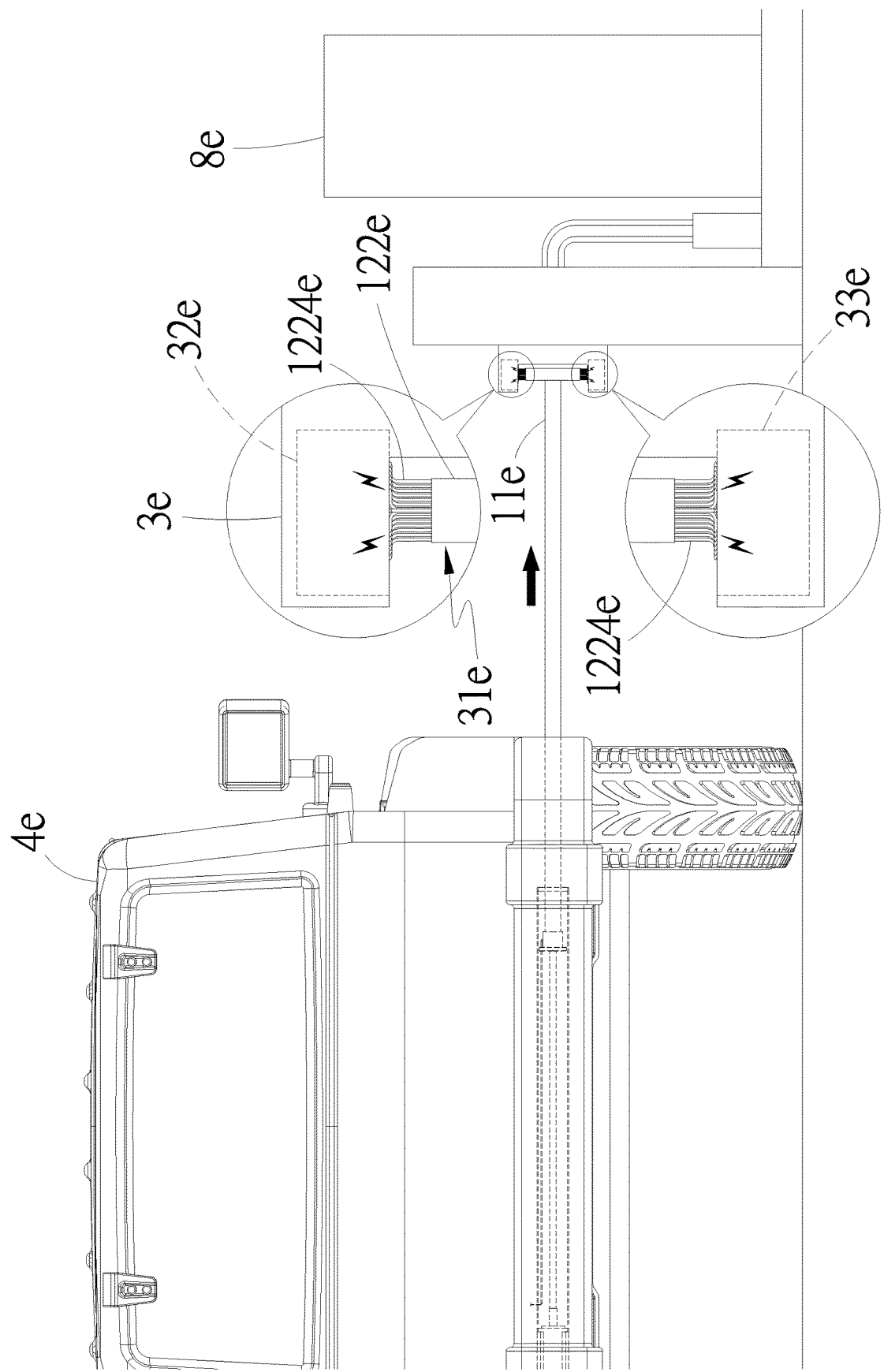
FIG. 11 is a schematic view showing an embodiment of a form of a contacting electricity-conducting member of the present invention.

Referring to FIG. 11, which is a schematic view showing an embodiment of a form of a contacting electricity-conducting member of the present invention, it can be clearly seen in the drawing that in the instant embodiment, direct current (DC) is taken as an example for the charging seat 3e, and the charging space 31e of the charging seat 3e is provided with a positive electricity portion 32e and a negative electricity portion 33e. The instant embodiment provides a contacting electricity-conducting member 122e as an example of illustration. Further, the electricity-conducting member 122e comprises a plurality of electrically conducting bodies 1224e, and in the instant embodiment, an example of the electrically conducting bodies 1224e is provided as conductive bristles. When charging is to be made to the electrical vehicle 4e, the extendible member 11e is extended to have the electricity-conducting member 122e move into the charging space 31e, and at this moment, the electrically conducting bodies 1224e on the upper and lower sides of the electricity-conducting member 122e are respectively set in contact with the positive electricity portion 32e and the negative electricity portion 33e, allowing the electricity of the charging seat 3e to transmit through the electricity-conducting member 122e to the conduction member, in order to proceed with charging toward the battery of the electrical vehicle 4e. The instant embodiment provides that the electricity-conducting member 122e of the invention can be of a contacting fashion, or a non-contacting fashion, and is not limited thereto. Further, in the instant embodiment, the charging seat 3e is electrically connected with an electricity supply device 8e, and the electricity supply device 8e can be a regular road-side transformer box. The charging seat 3e may comprise a transformer and a rectifier, so that the charging seat 3e may convert an alternate current supplied from the electricity supply device 8e into a direct current for charging, in a form of direct current, toward the electrical vehicle to increase the cruising endurability, the cost being low and construction time being short.

Figure 12:
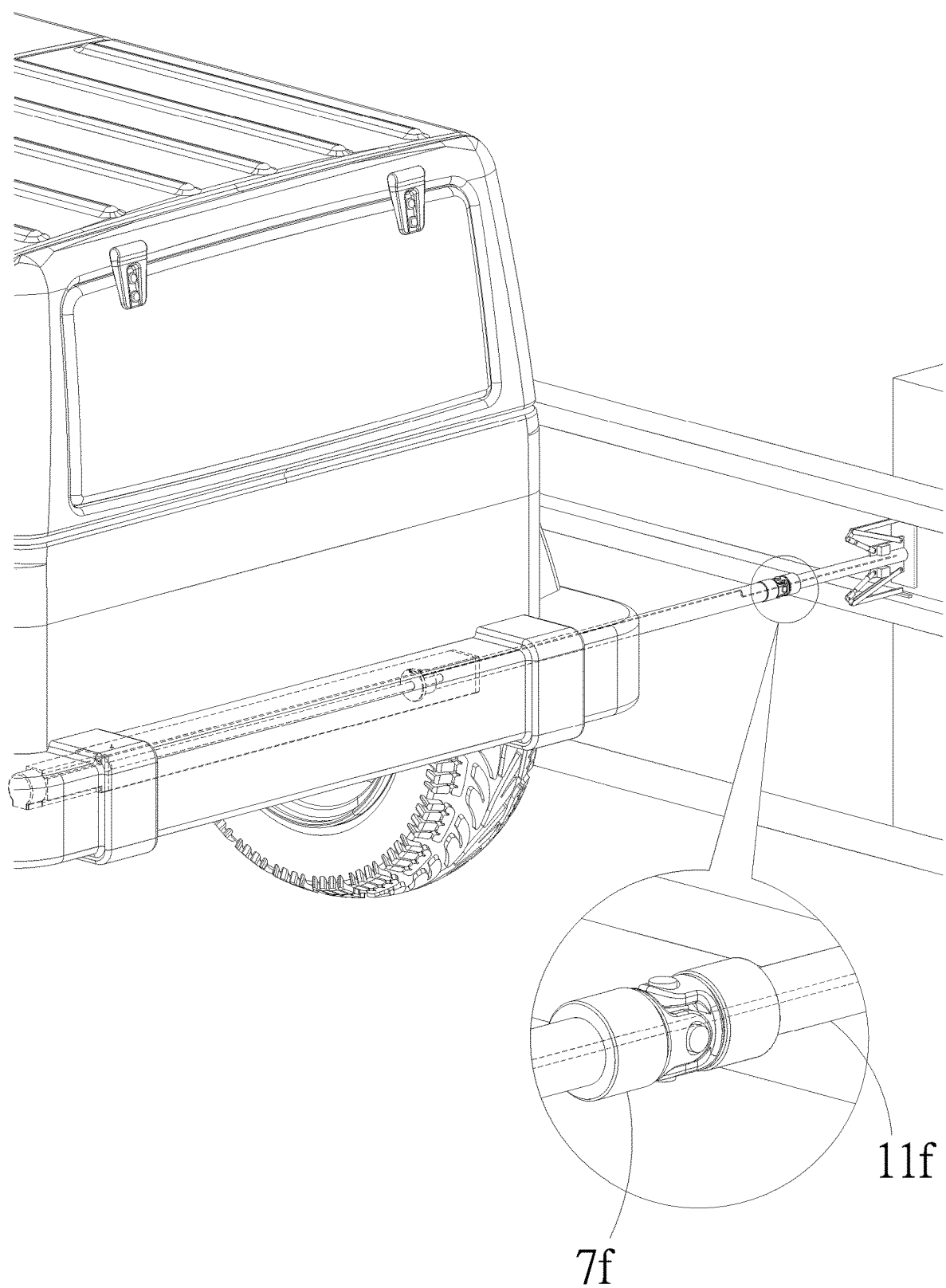
FIG. 12 is a schematic view showing an embodiment of a buffering member mounted on an extendible member according to the present invention.

Referring to FIG. 12, which is a schematic view showing an embodiment of a buffering member mounted on an extendible member according to the present invention, it can be clearly seen in the drawing that the extendible member 11f is provided with a buffering member 7f, and in the instant embodiment, a universal joint is taken as an example for the buffering member 7f, meaning when the extendible member 11f is extended in order to proceed with charging, the buffering member 7f provides an effect of buffering that effectively prevents the extendible member 11f from broken or ruptured due to impact or wind pressure. The instant embodiment provides that the extendible member 11f of the invention is not limited to glass fiber, carbon fiber, or nanometer boron fiber, and titanium alloy, and can be instead provided with a buffering member 7f to achieve the advantage of flexibility and being not easily broken.

Figure 13:
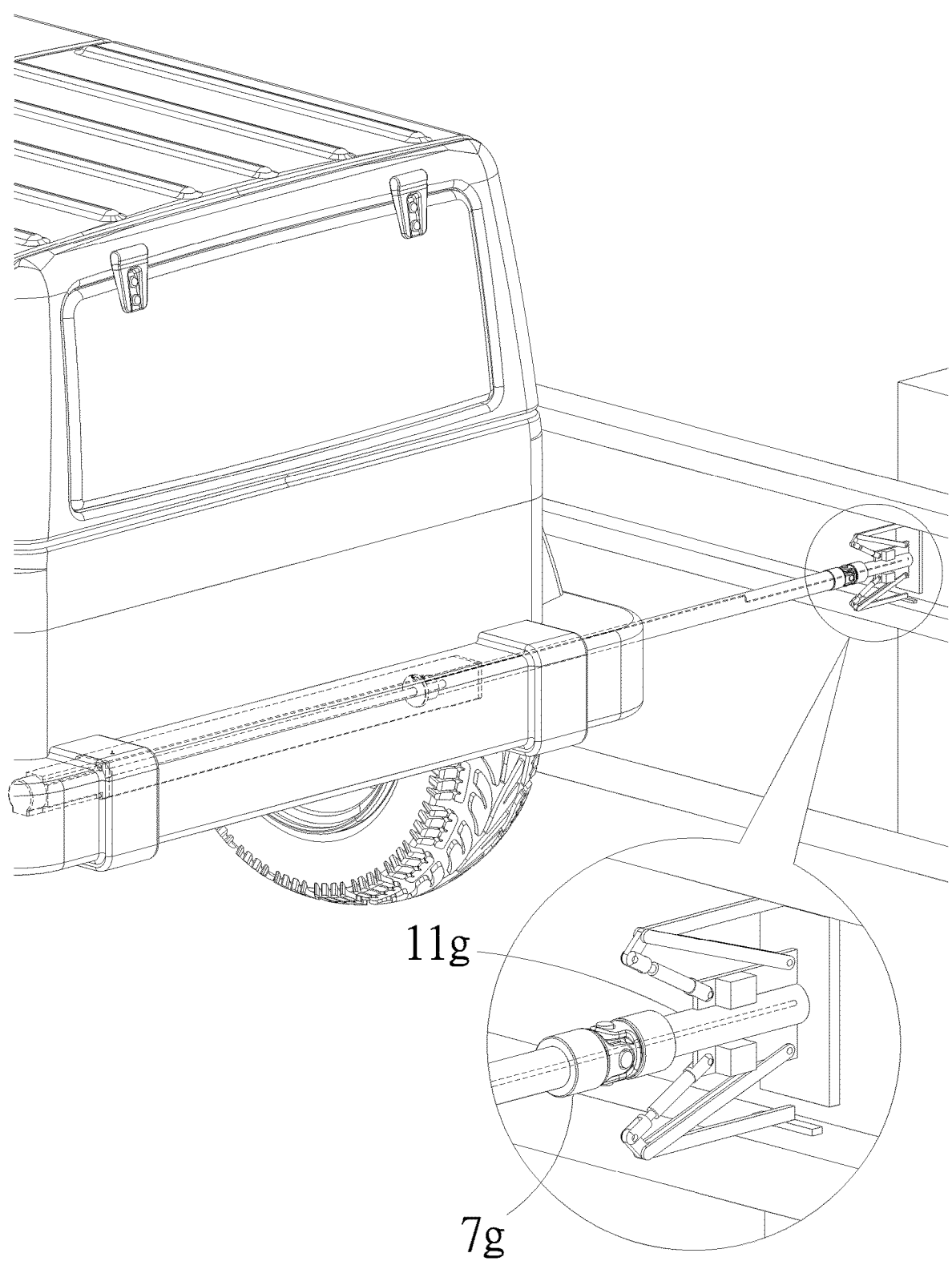
FIG. 13 is a schematic view showing an embodiment of a buffering member mounted to a front end of an extendible member according to the present invention.

Referring to FIG. 13, which is a schematic view showing an embodiment of a buffering member mounted to a front end of an extendible member according to the present invention, it can be clearly seen in the drawing that in the instant embodiment, a universal joint is taken as an example for the buffering member 7g mounted on the extendible member 11g, and in addition to being mounted at a middle part of the extendible member 11g, the mounting can be arranged at a front end of the extendible member 11g as illustrated in the instant embodiment. The instant embodiment provides that the buffering member 7g of the invention can be arranged at a middle section or may alternatively be arranged on a front section, but is not limited thereto.

Figure 14:
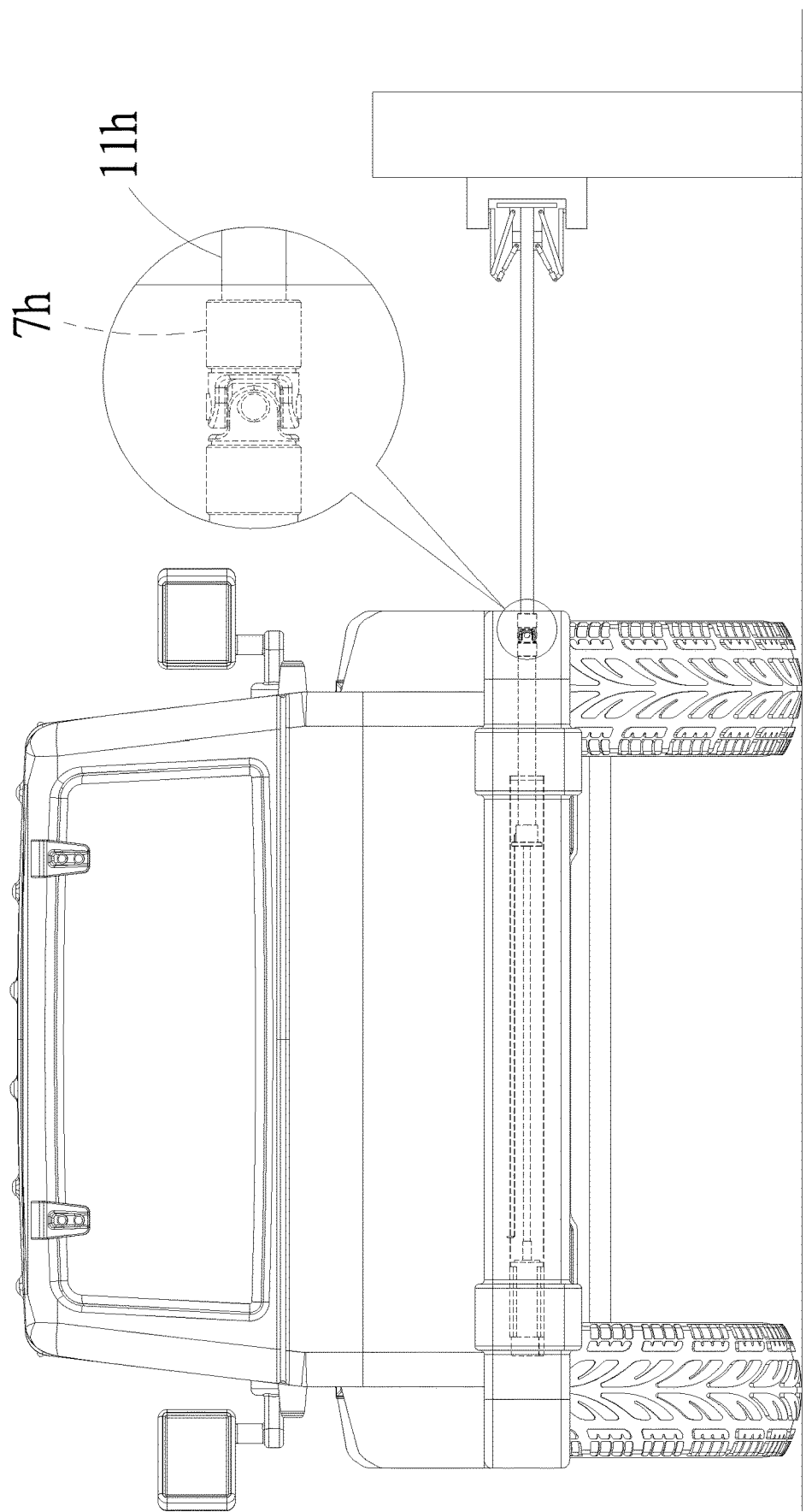
FIG. 14 is a schematic view showing an embodiment of a buffering member mounted to a rear end of an extendible member according to the present invention.

Referring to FIG. 14, which is a schematic view showing an embodiment of a buffering member mounted to a rear end of an extendible member according to the present invention, it can be clearly seen in the drawing that in the instant embodiment, a universal joint is taken as an example for the buffering member 7h mounted on the extendible member 11h, and in addition to being mounted at a middle part and a front end of the extendible member 11h, the mounting can be arranged at a rear end of the extendible member 11h as illustrated in the instant embodiment. The instant embodiment provides that the buffering member 7h of the invention can be arranged at a middle section or a front end, or may alternatively be arranged on a rear end, but is not limited thereto.

Figure 15:
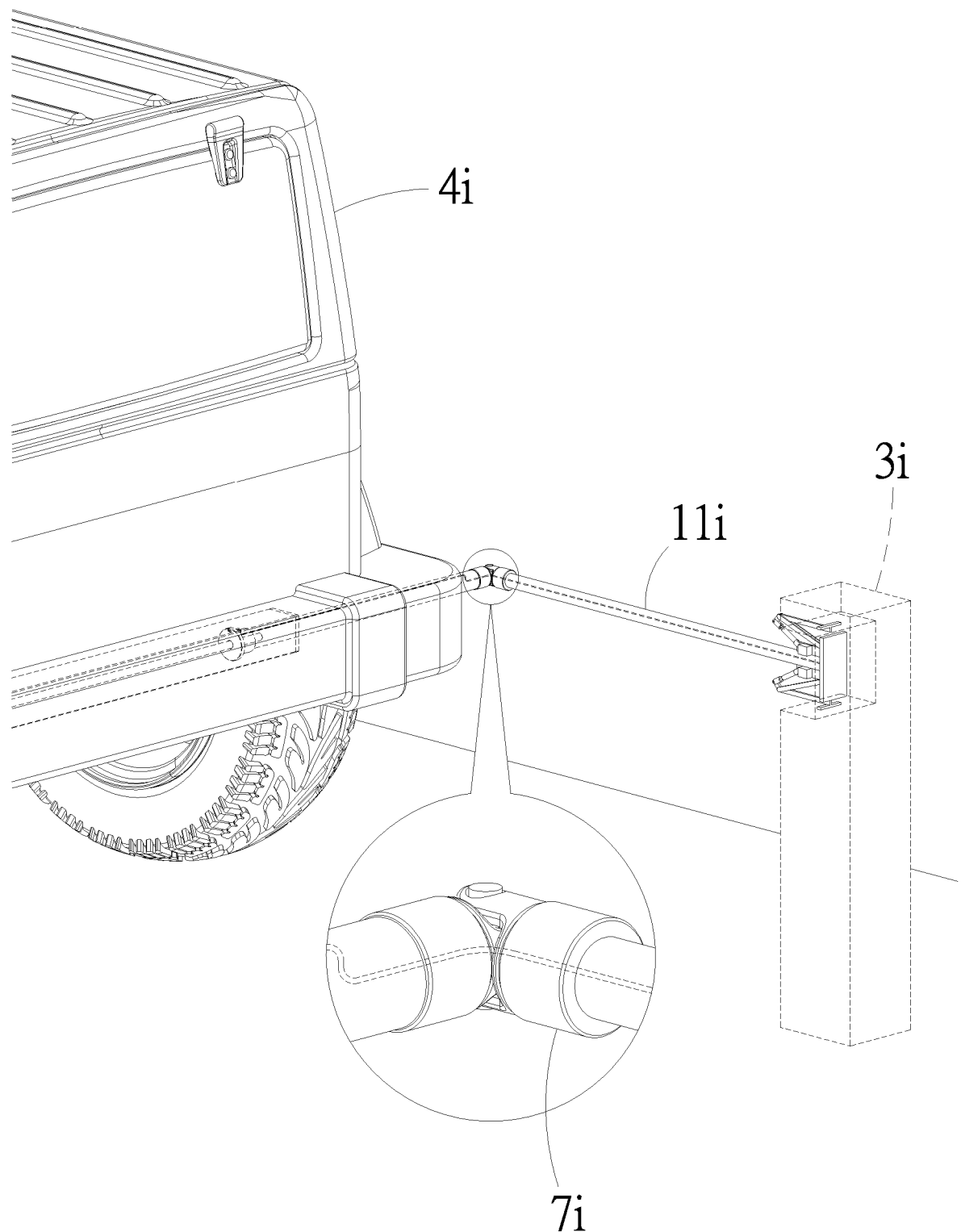
FIG. 15 is a schematic view showing direction changing of a buffering member according to the present invention.

Referring to FIG. 15, which is a schematic view showing direction changing of a buffering member according to the present invention, it can be clearly seen in the drawing that in the instant embodiment, a universal joint is taken as an example for the buffering member 7i, and change of direction by 90 degrees is provided as an example for illustration, meaning if the charging seat 3i is arranged on a rear side of the electrical vehicle 4*i*, the buffering member 7*i* may be applied to change the direction of the extendible member 11*i*, in order to achieve an effect of charging being performed for the electrical vehicle 4*i* being parked in any direction or the charging seat 3*i* being set at any direction.

Figure 16:
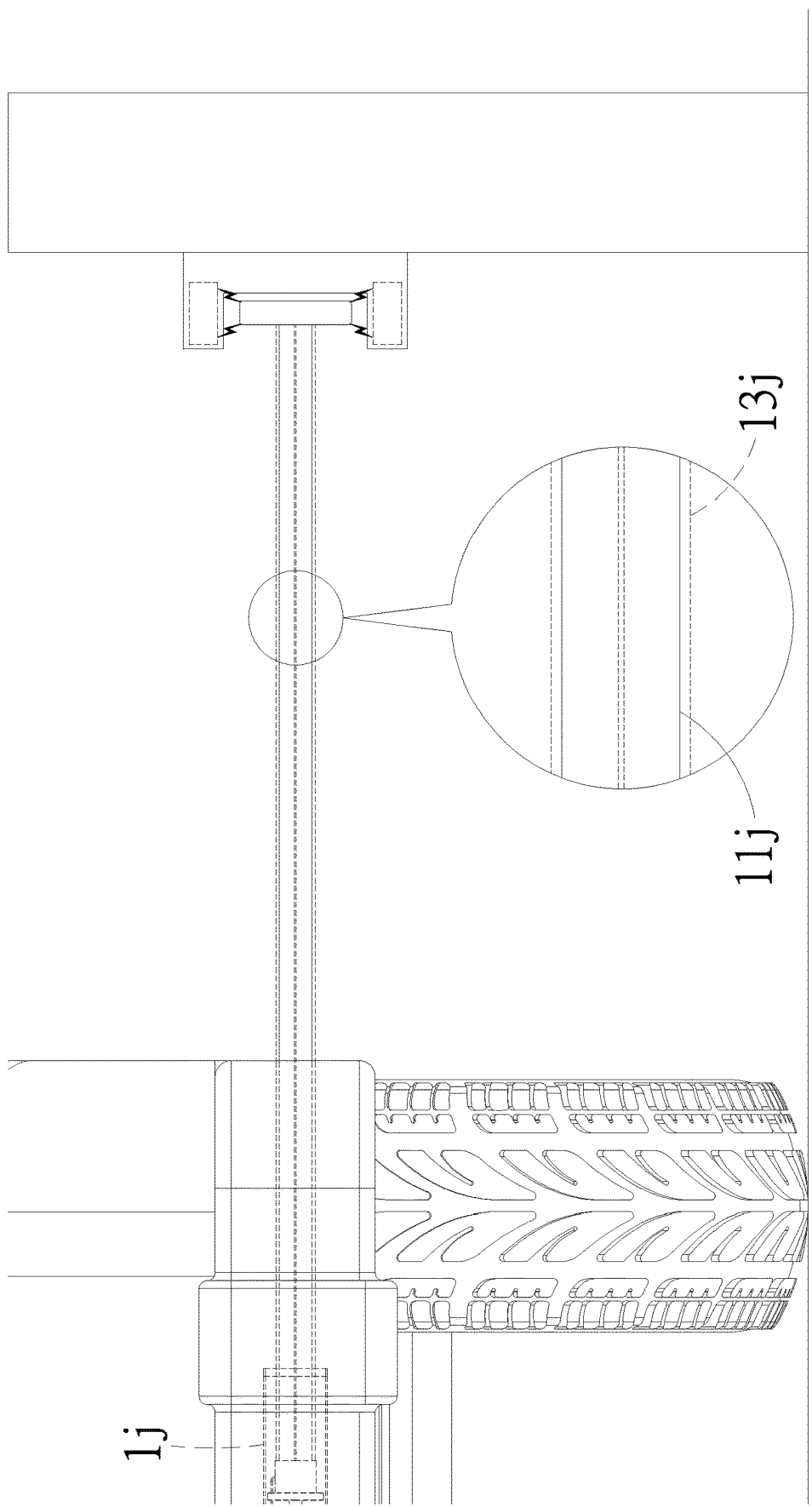
FIG. 16 is a schematic view showing an embodiment of an insulation conductor layer mounted on a surface of an extendible member and a base body according to the present invention.

Referring to FIG. 16, which is a schematic view showing an embodiment of an insulation conductor layer mounted on a surface of an extendible member and a base body according to the present invention, it can be clearly seen in the drawing that the extendible member 11*j* and the base body 1*j* are provided, on a surface thereof, with an insulation conductor layer 13*j*. In other words, with the arrangement of the insulation conductor layer 13*j*, the extension of the extendible member 11*j* does not cause any risk of electrical shocking due to accidental contact with the extendible member 11*j*, achieving operation safety.

Figure 17:
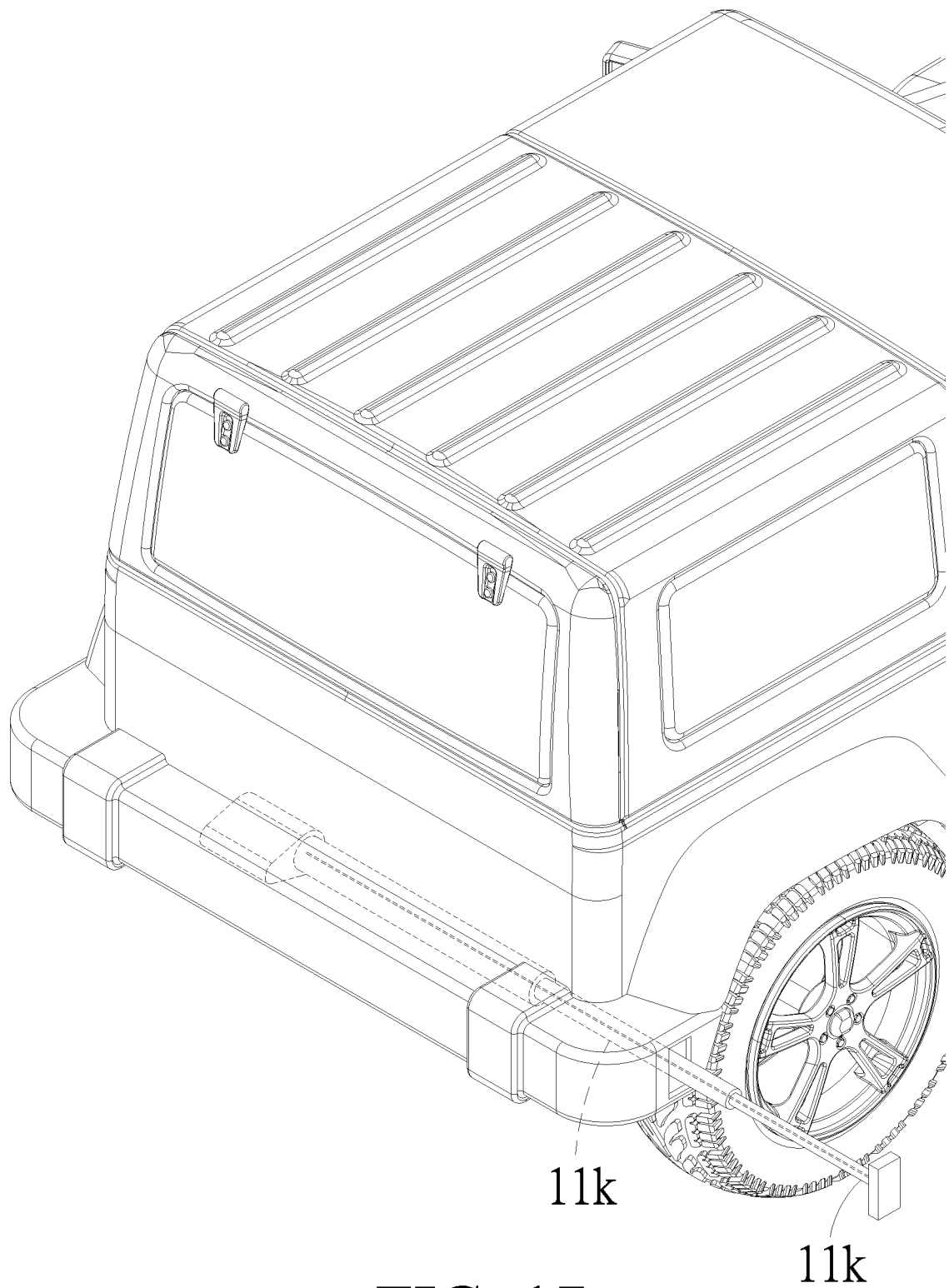
FIG. 17 is a schematic view showing an embodiment of a multiple-segmented extendible member according to the present invention.

Referring to FIG. 17, which is a schematic view showing an embodiment of a multiple-segmented extendible member according to the present invention, it can be clearly seen in the drawing that in the instant embodiment, an example is provided for the extendible member 11*k* is made up of two segments. In other words, the extendible member 11*k* of this invention can be of a form of one single segment, or can alternatively be of a form of multiple segments, and is not limited thereto.

Figure 18:
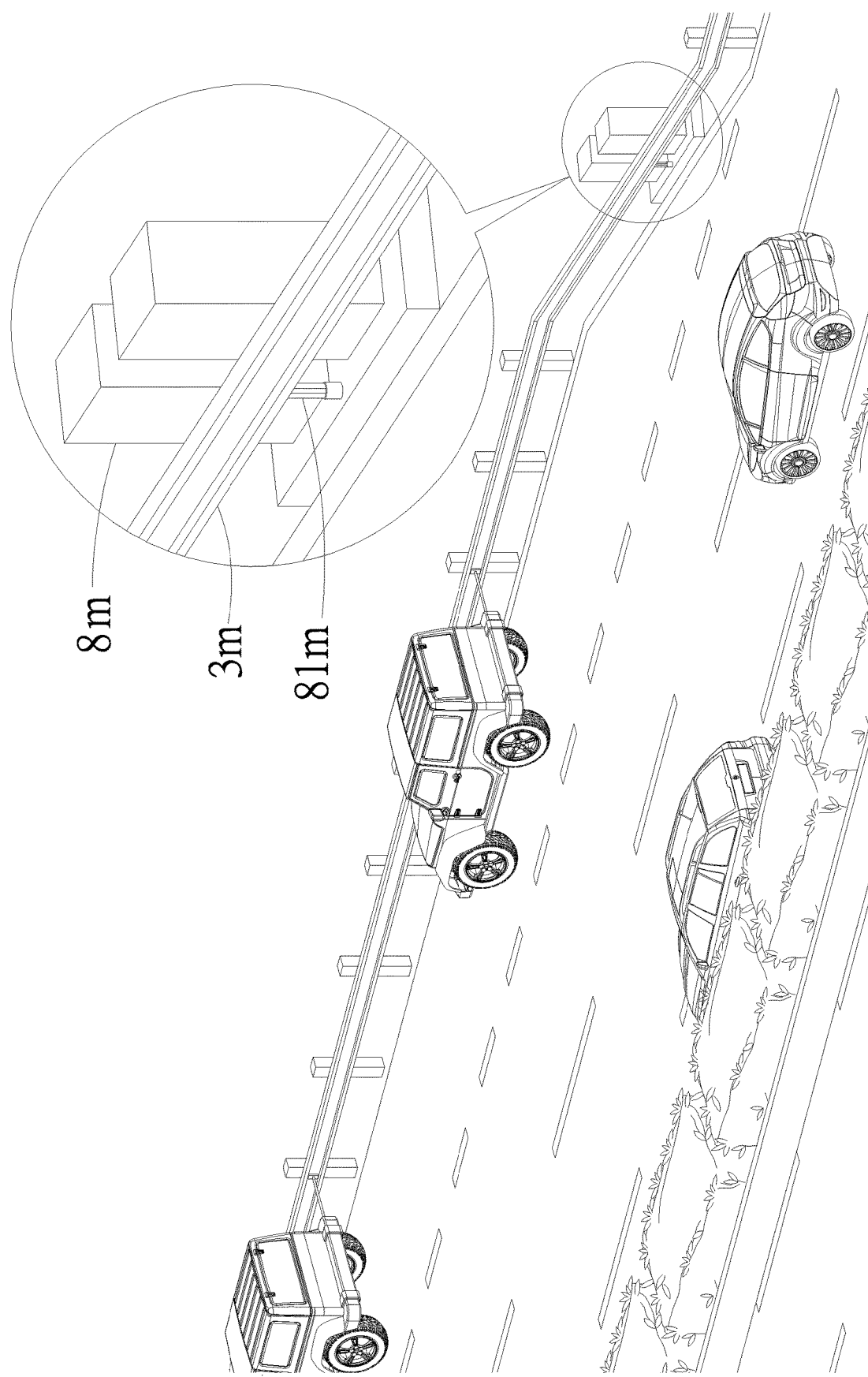
FIG. 18 is a schematic view showing an embodiment of combination of the present invention with an electricity supply device.

Referring to FIG. 18, which is a schematic view showing an embodiment of combination of the present invention with an electricity supply device, it can be clearly seen in the drawing that the charging seat 3*m* of this invention may be made in direct electrical connection with an electricity supply device 8*m*. The electricity supply device 8*m* can be a regular road-side transformer box, and there is no need to additionally install an electricity supply box. Further, in the instant embodiment, a road side guard rail is taken as an example for the charging seat 3*m*, while an example of the electricity supply device 8*m* can be a transformer box constructed by a utility company. Further, the electricity supply device 8*m* is electrically connectable with an electrical conductor 81*m*, and a power cable is taken as an example for the conductor 8*m* in the instant embodiment. As such, by means of an alternate current running through the electricity supply device 8*m*, electricity can be directly supplied through the electrical conductor 81*m* to the charging seat 3*m* in order to save construction expenditure to achieve the effect of effectively reducing cost and shortening construction time.

Figure 19:
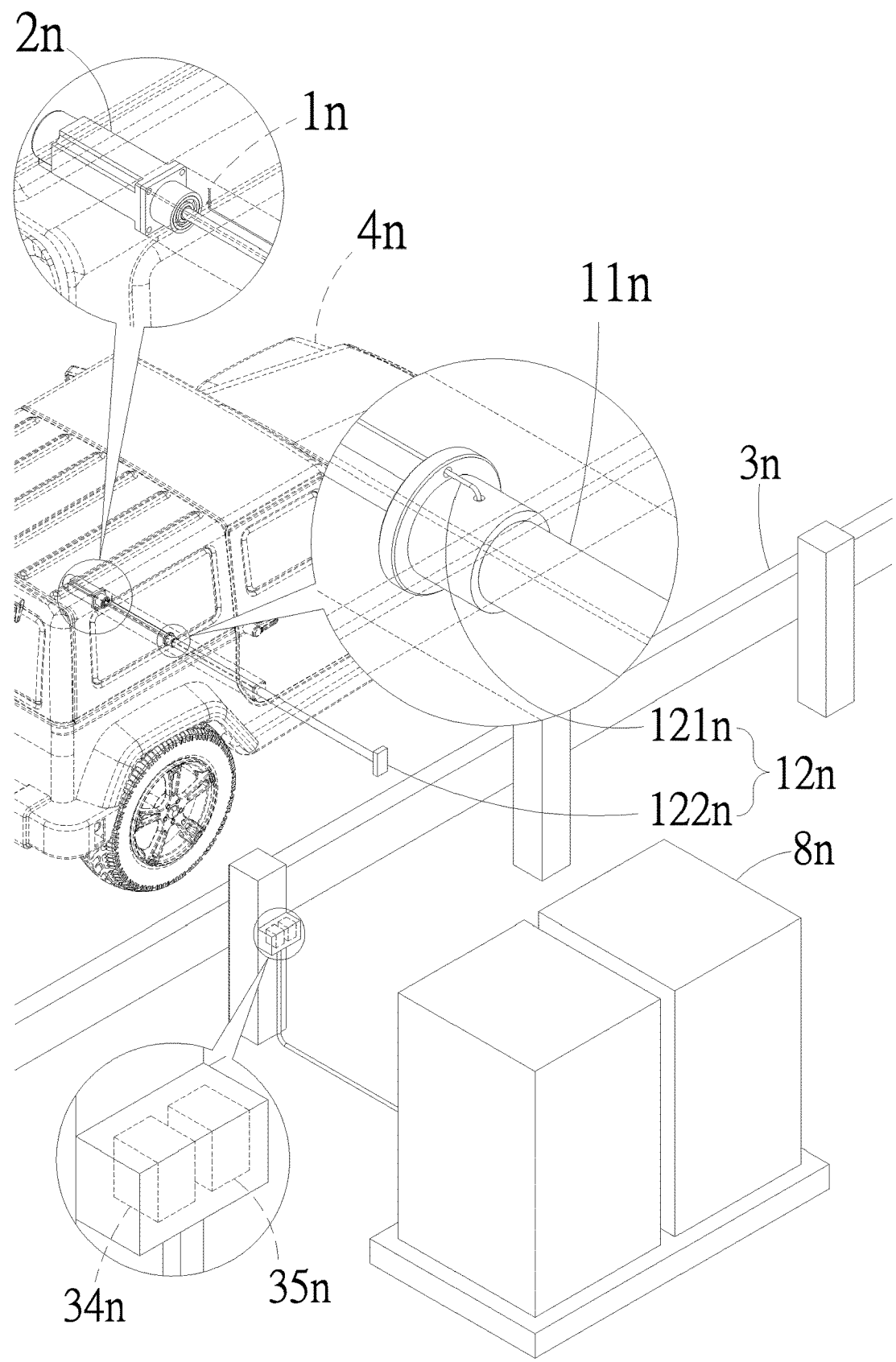
FIG. 19 is a perspective view, in a see-through form, showing another preferred embodiment according to the present invention.
Figure 20:
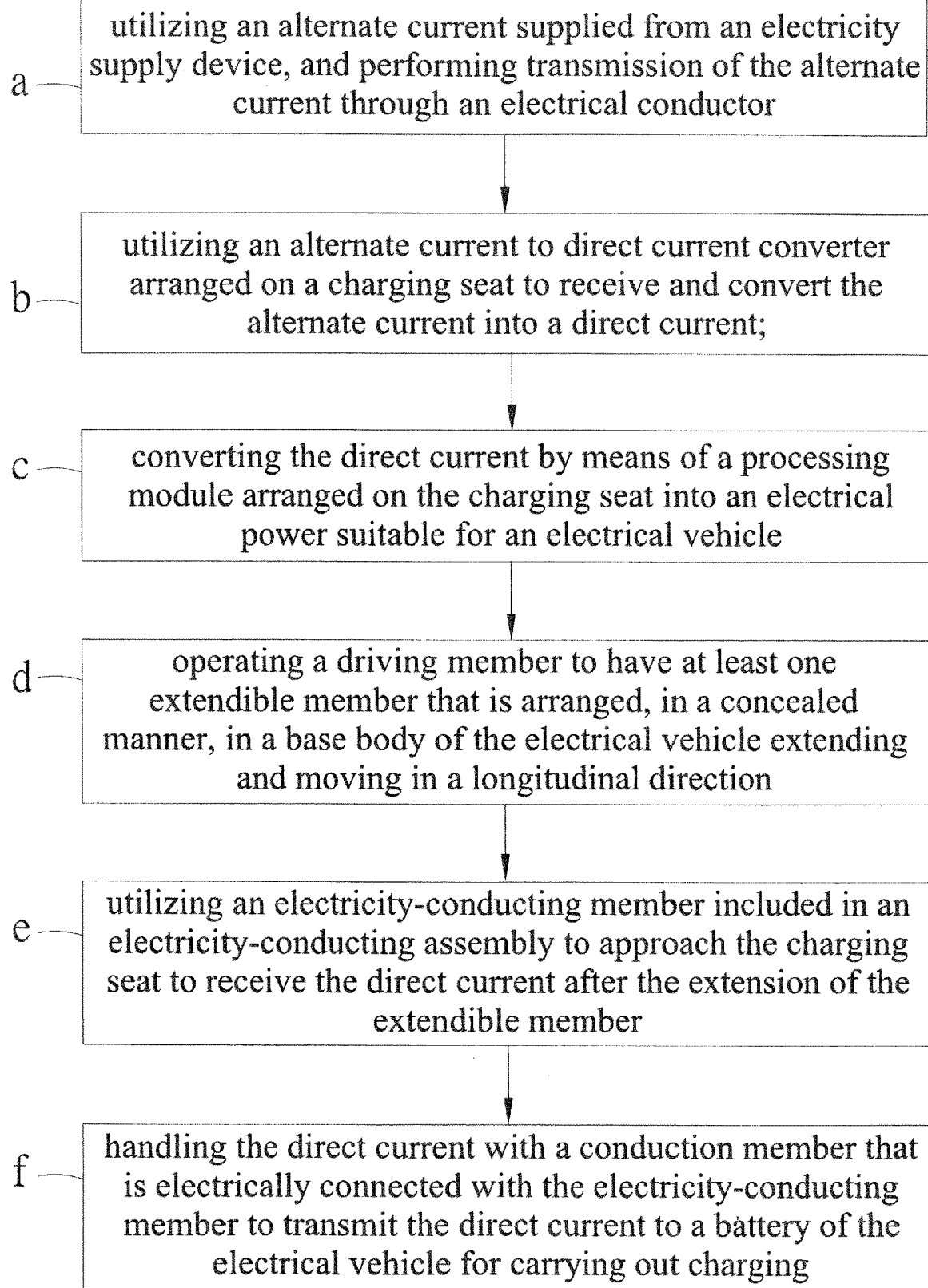
FIG. 20 is a block diagram showing a flow chart of another preferred embodiment according to the present invention.

Referring to FIGS. 19 and 20, which are respectively a perspective view, in a see-through form, showing another preferred embodiment according to the present invention and a block diagram showing a flow chart of another preferred embodiment according to the present invention, it can be clearly seen in the drawings that in the instant embodiment, arrangement that includes a base body 1*n* that is arranged, in a concealed manner, on a chassis of the electrical vehicle 4*n* is taken as an example for illustration. The base body 1*n* is provided with the extendible member 11*n*, and a driving member 2*n* is employed to control the extendible member 11*n* to do a reciprocal movement on the base body 1*n* in the longitudinal direction. Further, the extendible member 11*n* is provided with the electricity-conducting assembly 12*n*, and the electricity-conducting assembly 12*n* comprises the conduction member 121*n* that is electrically connected with the battery of the electrical vehicle 4*n* and at least one electricity-conducting member 122*n* arranged on an end of the extendible member 11*n* and electrically connected with the conduction member 121*n*. To charge, the following steps are performed for performing charging:

(a) utilizing an alternate current supplied from an electricity supply device, and performing transmission of the alternate current through an electrical conductor;

(b) utilizing an alternate current to direct current converter arranged on a charging seat to receive and convert the alternate current into a direct current;

(c) converting the direct current by means of a processing module arranged on the charging seat into an electrical power suitable for an electrical vehicle;

(d) operating a driving member to have at least one extendible member that is arranged, in a concealed manner, in a base body of the electrical vehicle extending and moving in a longitudinal direction;

(e) utilizing an electricity-conducting member included in an electricity-conducting assembly to approach the charging seat to receive the direct current after the extension of the extendible member; and (f) handling the direct current with a conduction member that is electrically connected with the electricity-conducting member to transmit the direct current to a battery of the electrical vehicle for carrying out charging.

In summary, the driving member 2*n* is operable to control the extendible member 11*n* to extend in the longitudinal direction, and the electricity-conducting member 122*n* is collaboratively operating in combination with a charging seat 3*n* to allow electricity to charge the battery of the electrical vehicle 4*n* by means of electrical conduction of the electricity-conducting member 122*n* and the conduction member 121*n*. The electricity supply device 8*n*, of which an example of a road-side transformer box, provides an alternate current of 120V to 480V, and example of the electrical the conductor 81*n* is a power cable. An example of the alternate current to direct current converter 34*n* is a rectification device. The processing module 35*n* can be a circuit module that is operable to boost the power of the direct current, in order to convert the direct current into an electrical power that can be directly changed into the battery of the electrical vehicle 4*n*, such as being converted to an electrical power of 60 KW-250 KW, or being converted to 32 ampers-80 amperes. As such, it can effectively achieve charging without parking and effectively resolving crises of running out of electricity in traffic congestion, and prolonging the travel distance, the entirety occupying less space and showing practical advantages of concealed stowage, low cost, operability in raining days, no safety concern, and no determination of the aesthetics of the vehicle body.

Thus, the key techniques based on which the concealed charging device of an electrical vehicle and a method thereof according to the present invention improve the prior art are as follows:

Firstly, the invention provides an arrangement of a through opening 411 in a vehicle body 41 to allow various mechanisms, including a base body 1 and an extendible member 11, to be readily receive and concealed inside the vehicle body 41, with an electricity-conducting member 122 being structured to have an outside shape completely corresponding to the through opening 411, so that observation made from outside of the surface of the electrical vehicle 4 does not easily identify the through opening 411, nor easily noticing such mechanisms including the base body 1 and the extendible member 11, and thus, possessing, as a whole, excellent property of concealment and achieving an advantage of extreme aesthetics.

Secondly, the charging seat 3 is made in perfect combination with a road-side guard rail so that during movement, the electrical vehicle 4 can still be charged, with the driver being not necessarily getting off the vehicle for operation, thereby effectively prolonging the travel distance of the electrical vehicle 4, and also help resolving the issue of electricity shortage for the electrical vehicle 4 in a traffic congestion to thereby releasing the driver's panic.

Thirdly, the invention is arranged, in an extendible manner, on a vehicle body 41, such as being arranged in an interior space of a front bumper, a rear bumper, or a side tread board, achieving an advantage of occupying no space and possessing stowage concealment, and also help provide safety even if not stowed and being exposed outside, and not causing any damage resulting from impact caused by bumpy roads.

Fourthly, the extendible member 11 is made of a material of glass fiber, carbon fiber, nanometer boron fiber, or titanium alloy, all featuring extendibility and flexibility, so that the extendible member 11 of the invention is, just like a fishing rod, not easily broken or ruptured, and possessing high level robustness.

Fifthly, in the invention, the charging seat 3e is combined with a guard rail and comprises a charging space 31e in the form of a trough, so that the positive electricity portion 32e and the negative electricity portion 33e are hidden inside the charging space 31e and are not wetted in the rain thereby possessing safety.

Sixthly, a surface of the extendible member 11j and the base body 1j is provided with an insulation conductor layer 13j, and with such an arrangement of the insulation conductor layer 13j, when the extendible member 11j is being extended, risks of electrical shocking due to accidental contact of the extendible member 11j may not occur, thereby possessing safety.

Seventhly, the arrangement of the buffering member 7f on the extendible member 11f generates an effect of buffering by means of the buffering member 7f that effectively prevent the extendible member 11f from issues of breaking or rupturing due to impact or wind pressure.

Eighthly, the arrangement of the decoration plate 6d allows the invention, after being stowed, to completely integrated with the vehicle body 41d, enhancing the overall aesthetics.

Ninthly, the arrangement of the linkage 1222d allows the electricity-conducting member 122d of the invention to include a function of extendibility thereby achieving effective reduction of size, making the area of the through opening further reduced to be even hard to notice the vehicle body 41d from the outside appearance, thereby achieving an effect of better concealment.

Tenthly, the charging seat 3 is directly mounted to a road-side guard rail and is distant from the road surface, so that even in a raining day, there is no risk of electrical shocking thereby greatly improving safety.

Eleventhly, a regular road-side transformer box 8m can be used to enable direct electrical connection of the charging seat 3m of the present invention therewith, without the need for additional installation of an electricity supply box, and as such, advantages such as effectively saving installation expenditure, saving construction cost, and shortening construction time can be achieved, and electricity supplied from the charging seat 3m is not limited to either a direct current or an alternate current, both being applicable, through the charging seat 3m, to charge the electrical vehicle.

Twelfthly, even in case that no through opening is formed, the invention can still be installed in a non-eye-attracting site of an electrical vehicle 4n, such as the chassis of the electrical vehicle 4n, in order to achieve the advantage of being concealed.

We claim:

1. A concealed charging device of an electrical vehicle, comprising:
   a base body, which is arranged, in a concealed manner, in the electrical vehicle;
   at least one extendible member, which is arranged on the base body and is reciprocally moveable in a longitudinal direction on the base body;
   an electricity-conducting assembly, which is arranged on the extendible member, the electricity-conducting assembly comprising a conduction member electrically connected with a battery of the electrical vehicle and at least one electricity-conducting member arranged at an end of the extendible member and electrically connected with the conduction member; and
   a driving member, which is arranged on the electrical vehicle and is electrically connected with the extendible member to control the reciprocal movement of the extendible member in the longitudinal direction on the base body, wherein the driving member drives the at least one extendible member to move linearly and reciprocally in a direction parallel to width of the electrical vehicle so that the electrical vehicle is chargeable while moving.

2. The concealed charging device of the electrical vehicle according to claim 1, wherein the electrical vehicle has a vehicle body that has a side in which a through opening is formed, and in a contracted state of the extendible member, the electricity-conducting member is received in the through opening, and in an extended state of the extendible member, the electricity-conducting member is away from the through opening.

3. The concealed charging device of the electrical vehicle according to claim 2, wherein the vehicle body comprises one of a bumper, a chassis, and a side tread board of the electrical vehicle.

4. The concealed charging device of the electrical vehicle according to claim 1, wherein the electricity-conducting member comprises a plurality of electrically conducting bodies provided thereon.

5. The concealed charging device of the electrical vehicle according to claim 1, wherein the electricity-conducting member is electrically connectable with a charging seat, and the charging seat comprises a charging space in the form of a trough, the charging space being provided, in an interior thereof, with a positive electricity portion and a negative electricity portion.

6. The concealed charging device of the electrical vehicle according to claim 5, wherein the charging seat includes one of a road-side guard rail and an upright charging pile.

7. The concealed charging device of the electrical vehicle according to claim 1, wherein a side of the electricity-conducting member that is opposite to the extendible member is provided with a decoration plate having a same color as a vehicle body.

8. The concealed charging device of the electrical vehicle according to claim 7, wherein the electricity-conducting member is implemented as multiple pieces, which are respectively arranged on two sides of the extendible member, and the electricity-conducting member comprises a base portion, a linkage that is arranged on the base portion, and a conductor that is arranged on an end of the linkage that is opposite to the base portion, the linkage comprising a first link pivoted to the base portion, a second link pivoted to the base portion, and a third link having an end pivoted to an end of each of the first link and the second link that is opposite to the base portion, the conductor being arranged on the third link.

9. The concealed charging device of the electrical vehicle according to claim 1, wherein the extendible member is provided with a buffering member mounted thereon.

10. The concealed charging device of the electrical vehicle according to claim 1, wherein a surface of the extendible member and the base body is provided with an insulation conductor layer.

11. The concealed charging device of the electrical vehicle according to claim 5, wherein the charging seat in electrically connectable with an electrical conductor, the electrical conductor being electrically connected with an electricity supply device.

12. The concealed charging device of the electrical vehicle according to claim 6, wherein the charging seat is connectable with the electricity-conducting member by means of electromagnetic coil induction connection.

* * * * *